(12) United States Patent
Marti et al.

(10) Patent No.: US 9,998,877 B2
(45) Date of Patent: *Jun. 12, 2018

(54) PATHWAY MATCHING

(71) Applicant: Apple Inc., Cupertino, CA (US)

(72) Inventors: Lukas M. Marti, Santa Clara, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/981,633

(22) Filed: Dec. 28, 2015

(65) Prior Publication Data
US 2016/0198308 A1    Jul. 7, 2016

Related U.S. Application Data

(63) Continuation of application No. 13/683,474, filed on Nov. 21, 2012, now Pat. No. 9,226,111.

(51) Int. Cl.
*H04W 4/04*   (2009.01)
*G01C 21/20*  (2006.01)
*G01S 5/02*   (2010.01)

(52) U.S. Cl.
CPC .......... *H04W 4/043* (2013.01); *G01C 21/206* (2013.01); *G01S 5/0252* (2013.01); *G01S 5/0278* (2013.01); *G01S 5/0294* (2013.01)

(58) Field of Classification Search
CPC ....... H04W 4/02; H04W 4/021; H04W 4/023; H04W 4/04; H04W 4/043; H04W 64/00; G01S 5/00; G01S 5/02; G01S 5/0252; G01S 5/0278; G01S 5/0284; G01S 5/0294; G01S 5/14; G01C 21/206
(Continued)

(56) References Cited

U.S. PATENT DOCUMENTS 7,606,687 B2  10/2009  Galbreath et al.
7,761,233 B2   7/2010  Schott et al.
(Continued)

FOREIGN PATENT DOCUMENTS

CN  102724751  10/2012
CN  102752855  10/2012

OTHER PUBLICATIONS

Application of Particle Filters for Indoor Positioning Using Floor Plans Copyright 2010 IEEE Pavel Davidson, Jussi Collin, and Jarmo Takala.*
(Continued)

*Primary Examiner* — Michael Mapa
(74) *Attorney, Agent, or Firm* — Fish & Richardson P.C.

(57) ABSTRACT

Methods, program products, and systems for estimating a location of a mobile device in a venue are provided. The venue can have pathways represented by a path network that includes segments connected by junctions. Estimating the location can include determining a first set of candidate locations for the mobile device, and mapping some of the candidate locations to updated candidate locations that are on or closer to one or more segments of the path network based on distances between the candidate locations and respective segments, resulting in a second set of candidate locations for the mobile device. The location of the mobile device can be derived from the second set of candidate locations.

17 Claims, 25 Drawing Sheets

(58) Field of Classification Search
USPC .................. 455/404.2, 414.2, 456.1–457
See application file for complete search history.

(56) References Cited

U.S. PATENT DOCUMENTS

| | | | |
|---|---|---|---|
| 8,046,163 | B2 | 10/2011 | Rashid |
| 8,229,164 | B2 | 7/2012 | Miyamoto et al. |
| 8,290,511 | B2 | 10/2012 | Burdo et al. |
| 8,392,107 | B2 | 3/2013 | Patel et al. |
| 8,494,762 | B2 | 7/2013 | Patel et al. |
| 8,498,811 | B2 | 7/2013 | Lundquist et al. |
| 8,538,389 | B1 | 9/2013 | Evans et al. |
| 8,594,701 | B2 | 11/2013 | Pakzad |
| 8,718,932 | B1* | 5/2014 | Pack ............... G01C 21/30 701/447 |
| 8,849,308 | B2 | 9/2014 | Marti et al. |
| 8,996,302 | B2 | 3/2015 | Marti et al. |
| 9,226,111 | B2 | 12/2015 | Marti et al. |
| 2006/0178809 | A1* | 8/2006 | Couckuyt ............ G01C 21/20 701/445 |
| 2008/0167049 | A1 | 7/2008 | Karr et al. |
| 2009/0061903 | A1 | 3/2009 | Khokhar |
| 2009/0265104 | A1 | 10/2009 | Shroff |
| 2010/0039929 | A1 | 2/2010 | Cho et al. |
| 2011/0077862 | A1* | 3/2011 | Huang ............... G01C 21/30 701/532 |
| 2011/0178705 | A1 | 7/2011 | Pakzad et al. |
| 2011/0196647 | A1 | 8/2011 | Perala et al. |
| 2011/0288771 | A1* | 11/2011 | Mazlum ............. G01S 19/50 701/469 |
| 2011/0313648 | A1* | 12/2011 | Newson ............. G01C 21/30 701/447 |
| 2012/0007779 | A1 | 1/2012 | Klepal et al. |
| 2012/0066035 | A1 | 3/2012 | Stanger et al. |
| 2012/0203453 | A1 | 8/2012 | Lundquist et al. |
| 2012/0232795 | A1 | 9/2012 | Robertson et al. |
| 2012/0302263 | A1 | 11/2012 | Tinnakornsrisuphap |
| 2012/0310591 | A1 | 12/2012 | Win et al. |
| 2013/0102248 | A1 | 4/2013 | Jay et al. |
| 2013/0141233 | A1 | 6/2013 | Jacobs et al. |
| 2013/0257657 | A1 | 10/2013 | Garin et al. |
| 2013/0339478 | A1 | 12/2013 | Edge et al. |
| 2014/0018095 | A1* | 1/2014 | Parvizi ............. H04W 4/025 455/456.1 |
| 2014/0141796 | A1 | 5/2014 | Marti et al. |
| 2014/0141803 | A1 | 5/2014 | Marti et al. |
| 2014/0156180 | A1 | 6/2014 | Marti et al. |

OTHER PUBLICATIONS

Chinese Office Action in Application No. 201380059671.9, dated May 18, 2016, 18 pages.

Ascher et al., "Dual IMU Indoor Navigation with Particle Filter Based Map-Matching on a Smartphone", 2010 International Conference on Indoor Positioning and Indoor Navigation (IPIN), pp. 1-5, Sep. 15-17, 2010, Zurich, Switzerland.

Chao et al., "Location-Constrained Particle Filter for RSSI-Based Indoor Human Positioning and Tracking System", IEEE Workshop on Signal Processing Systems, Oct. 8, 2008, pp. 73-76.

Davidson et al., "Application of Particle Filters for Indoor Positioning Using Floor Plans", Ubiquitous Positioning Indoor Navigation and Location Based Service (UPINLBS), 4 pages, Oct. 14-15, 2010.

Joshi, "A New Approach to Map Matching for In-Vehicle Navigation Systems: The Rotational Variation Metric", 2001 IEEE Intelligent Transportation Systems Conference Proceedings—Oakland (CA), USA pp. 33-38, Aug. 25-29, 2001.

Peker et al., "Particle Filter Vehicle Localization and Map-Matching Using Map Topology", 2011 IEEE Intelligent Vehicles Symposium (IV) Baden-Baden, Germany, pp. 248-253, Jun. 5-9, 2011.

Spassov, "Algorithms for Map-Aided Autonomous Indoor edestrian Positioning and Navigation", http://biblion.epfl.ch/EPFL/theses/2007/3961/EPFL_TH3961.pdf, Nov. 23, 2007.

Wakuda et al., "An Adaptive Map-Matching Based on Dynamic Time Warping for Pedestrian Positioning Using Network Map", Position Location and Navigation Symposium (PLANS), 2012 IEEE/ION, pp. 590-597, Apr. 23-26, 2012.

Widyawan et al., "Influence of Predicted and Measured Fingerprint on the Accuracy of RSSI-based Indoor Location Systems", 4th Workshop on Positioning, Navigation and Communication 2007 (WPNC '07), IEEE, Mar. 1, 2007, pp. 145-151.

Widyawan et al., "A novel backtracking particle filter for pattern matching indoor localization", Proceedings of the First ACM International Workshop on Mobile Entity Localization and Tracking in GPS-LESS Environments, MELT '08, Jan. 1, 2008.

Yang et al., "An Improved Map-Matching Algorithm Used in Vehicle Navigation System", Intelligent Transportation Systems, 2003. Proceedings of IEEE, pp. 1246-1250.

Zhao et al., "A Map Matching Algorithm in GPS-based Car Navigation System", Intelligent Information Hiding and Multimedia Signal Processing, 2007. IIHMSP 2007. Third International Conference, pp. 77-80, Nov. 26-28, 2007.

Zhuang et al., "SMART: Simultaneous Indoor Localization and Map Construction Using Smartphones", 2010 International Joint Conference on Neural Networks (IJCNN), Jul. 18, 2010, pp. 1-8.

Authorized Officer Heinz Senkel, Notification of Transmittal of the International Search Report and Written Opinion of the International Searching Authority, International Application No. PCT/US2013/070738, dated Feb. 18, 2014, 12 pages.

Authorized Officer Heinz Senkel, Notification of Transmittal of the International Search Report and Written Opinion of the International Searching Authority, International Application No. PCT/US2013/070735, dated Mar. 27, 2014, 14 pages.

* cited by examiner

PATHWAY MATCHING

CROSS-REFERENCE TO RELATED APPLICATION

This application is a continuation application of and claims priority to U.S. application Ser. No. 13/683,474, filed on Nov. 21, 2012.

TECHNICAL FIELD

This disclosure relates generally to location determination.

BACKGROUND

Some mobile devices have features to determine a geographic location. For example, a mobile device can include a receiver for receiving signals from a global positioning system (GPS). The mobile device can determine a geographic location, including latitude and longitude, using the GPS signals. In many places, GPS signals can be nonexistent, weak, or subject to interference such that it is not possible to determine a location using the GPS receiver on a mobile device. For example, a conventional mobile device often fails to determine a location based on GPS signals when the device is inside a building or tunnel.

SUMMARY

Methods, program products, and systems for performing pathway matching to assist in determining a location of a mobile device are described. Information about pathways in a venue is used in a way to allow flexibility in the matching of candidate locations to the pathways.

In one aspect, a method for estimating a location of a mobile device in a venue is provided. The venue can have pathways represented by a path network that includes segments connected by junctions. Estimating the location includes determining a first set of candidate locations for the mobile device, mapping some of the candidate locations to updated candidate locations that are on or closer to one or more segments of the path network based on distances between the candidate locations and respective segments, resulting in a second set of candidate locations for the mobile device, and deriving the location of the mobile device from the second set of candidate locations.

In one aspect, a method for estimating a location of a mobile device in a venue is provided. The method includes identifying a path network representing pathways in a venue comprising a space accessible by a movable body carrying a mobile device and one or more constraints of movement of the movable body, the path network including segments that are connected by junctions; determining an estimated location of a mobile device; updating the estimated location to derive an updated estimated location, taking into account constraints imposed by the segments of the path network; propagating the updated estimated location of the mobile device using a state space model to generate a propagated estimated location, taking into account of a sensor reading from a sensor that senses an environment variable, and one or more constraints of movement of the movable body, but without being constrained to the segments of the path network; and determining an updated estimated location of the mobile device based on the propagated estimated location.

In one aspect, a mobile device includes a sensor to sense an environment variable; a storage, and a processor. The storage is configured to store map data associated with a venue comprising a space accessible by a movable body and one or more constraints of movement of the movable body, the map data including information about a path network representing pathways in the venue, the path network including segments connected by junctions. The processor is configured to determine a first estimated location of the mobile device. If the first estimated location is not on the path network, a first segment in the path network is identified and the first estimated location is mapped to a second estimated location that is on or closer to the first segment based on a distance between the first estimated location and the first segment. The processor is configured to determine a current location of the mobile device based on the second estimated location and a sensor reading from the sensor.

In one aspect, a mobile device includes a sensor to sense an environment variable, a storage, and a processor. The storage is configured to store map data associated with a venue comprising a space accessible by a movable body and one or more constraints of movement of the movable body, the map data including information about a path network representing pathways in the venue, the path network including segments connected by junctions. The processor is configured to determine a first set of candidate locations for the mobile device, map some of the candidate locations to updated candidate locations that are on or closer to one or more segments of the path network based on distances between the candidate locations and respective segments, resulting in a second set of candidate locations for the mobile device, receive a sensor reading from the sensor, propagate the second set of candidate locations based on the sensor reading and map data, resulting in a third set of candidate locations, and estimate the location of the mobile device based on the third set of candidate locations.

Pathway matching can be implemented to achieve the following advantages. When a pathway is imposed as a strict constraint (e.g., snapping a location estimate to an underlying pathway, close-loop operation of a state space estimator), it may lead to large estimation errors as soon as a user violates the imposed constraint or the fundamental estimation uncertainty is much larger than the underlying constraints. By providing elasticity in pathway matching, it is possible to model pedestrian behavior more accurately and increase the accuracy of location estimates.

The details of one or more implementations of location determination using pathway matching are set forth in the accompanying drawings and the description below. Other features, aspects, and advantages of location determination using pathway matching will become apparent from the description, the drawings, and the claims.

BRIEF DESCRIPTION OF THE DRAWINGS

Like reference symbols in the various drawings indicate like elements.

DETAILED DESCRIPTION

Pathway Matching

A venue such as a campus, a building, a shopping mall, or an airport often has pedestrian pathways. Examples of pathways include hallways in a building, paths in a shopping mall that are often traveled by shoppers visiting various stores, and paths in an airport that are frequently used by travelers who move from ticket counters through security checkpoints to various terminals. Information about the pathways may be useful for a mobile device to determine its location in the venue. However, a pedestrian carrying the mobile device may not necessarily adhere to a given pathway. For example, walking in an airport, the pedestrian may check out different shops, turn around to look after family, or transition back and forth between the left and right side of a given hallway. Thus, it is useful to provide a probability model to represent the likelihood that an estimated location for the mobile device should be matched to a nearby pathway, or be shifted toward the pathway.

In this description, the mobile device can be, for example, a cell phone, a personal digital assistant, a tablet computer, a laptop computer, a camera, a music player, a video player, a video recorder, or any other portable device that provides the function of location estimation.

In some implementations, the location of the mobile device can be determined by a location estimator that uses a state space model. For example, the location estimator can include a particle filter that samples candidate locations of the mobile device. The location estimator receives sensor measurements periodically, which are used to update the positions of the candidate locations. In between measurements, the candidate locations may be propagated according to the state space model, taking into account map data that shows constraints of movements, such as walls or other obstacles. For example, when propagating the candidate locations, they should not pass through walls or other barriers that would block the passage of a pedestrian. The distribution of the particles is used to determine the location of the mobile device.

In some implementations, the pathway information is used to update the candidate locations after measurement step, but the propagation step does not constrain the candidate locations to the pathways. This models the real-life scenario where pedestrians often do not strictly follow pathways.

Figure 1:
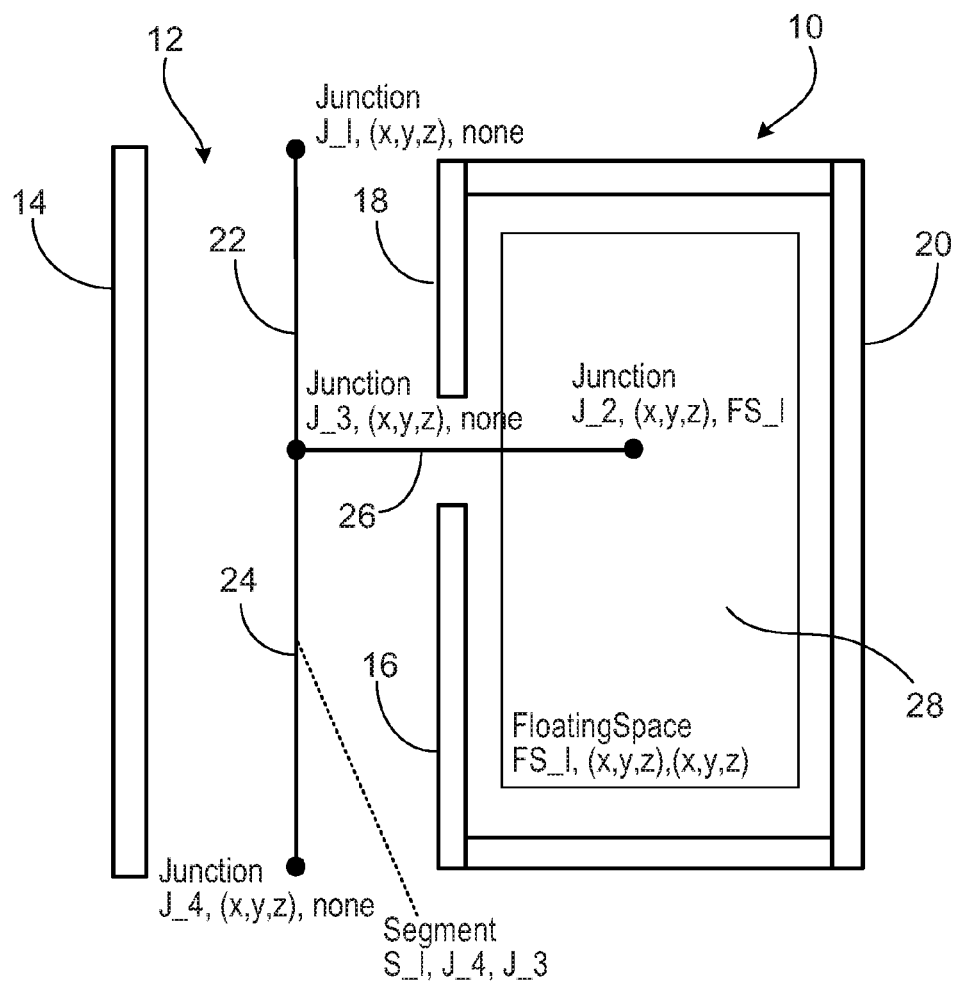
FIG. 1 is a diagram of a map representing a venue having pathways.

Referring to FIG. 1, in a map representing a venue, pathways can be represented as a path network that includes segments connected by junctions. In the example of FIG. 1, a map 10 shows hallway 12 bound by a wall 14 on one side and walls 16 and 18 on the other side. An opening between walls 16 and 18 provides an entrance to room 28, which is bound by walls 16, 18, and 20. Hallway 12 is represented by a path that extends near a centerline of hallway 12. The path is represented by segments 22 and 24. A path from hallway 12 into room 28 is represented by a segment 26. Segments 12, 14, and 16 are connected at junction J_3. Each segment on the path network can represent a narrow, extended region that is, e.g., about one meter wide.

When a state space model (e.g., a particle filter) is used to estimate the location of a mobile device in a venue, candidate locations can be propagated to simulate a probability density distribution of possible locations of the mobile device. The candidate locations can adhere to constraints of movement to a pedestrian carrying the mobile device. For example, a candidate location should not propagate through a wall since the wall will block passage of the pedestrian. Propagation of the candidate locations can also take into account of pathways in the venue. Because there is a tendency for pedestrians to follow a pathway, a candidate location that is near a pathway can be "snapped" onto the pathway or pulled closer to the pathway.

Figure 2A:
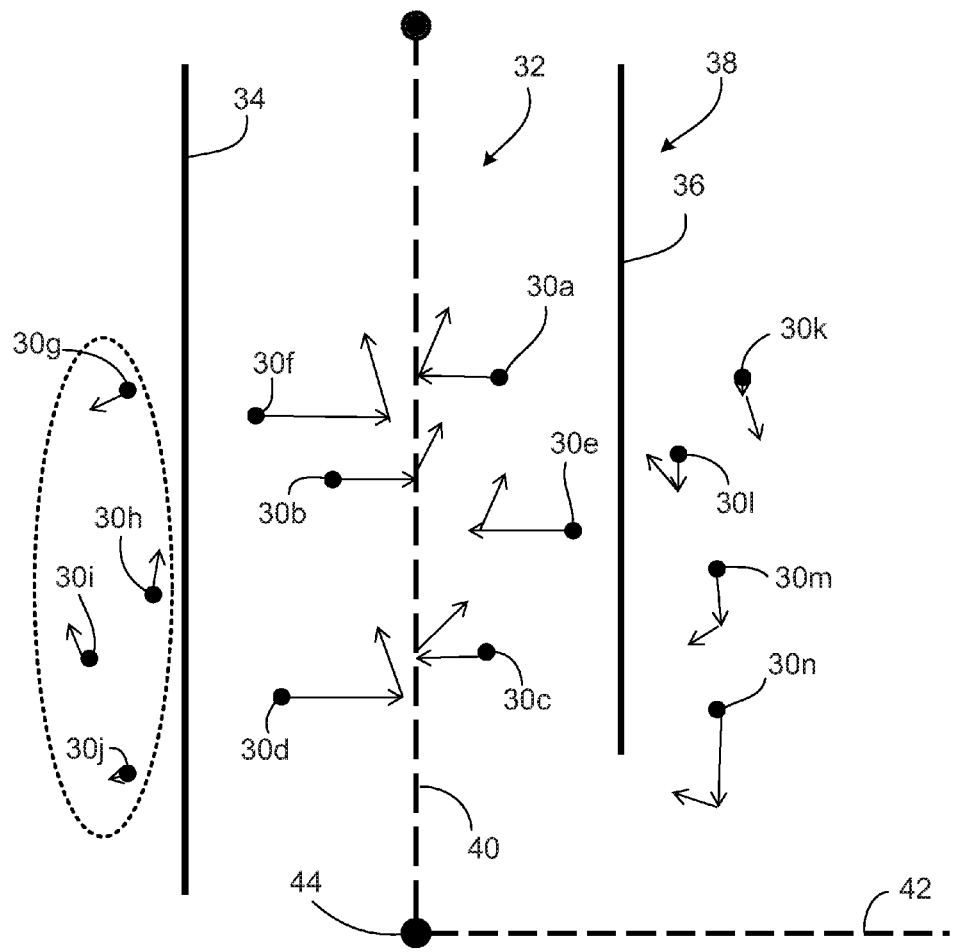
FIGS. 2A to 2D are diagrams showing pathway matching and propagation of candidate locations.

Referring to FIG. 2A, venue 38 has a hallway 32 defined by walls 34 and 36. The hallway 32 is a pathway represented as segment 40. Segment 40 is connected to another segment 42 (representing another pathway) at junction 44. When a state space model is used to determine the location of a mobile device in hallway 32, candidate locations (e.g., 30a-30n, collectively referenced as 30) can be used to simulate a probability density distribution of the possible locations of the mobile device. Each iteration of the state space model involves a measurement step, a pathway matching step, and a propagation step.

In the measurement step, candidate locations 30 are updated according to sensor inputs. For example, measurements of WiFi signals can be compared with a WiFi signal signature database to provide an estimate of the location of the mobile device. Measurements of other types of environment variables, such as Bluetooth or cellular signals, barometric pressure, or magnetic field, can also be used.

In the pathway matching step, for each of candidate locations 30, a search is performed to identify segments that are "visible" to the candidate location. A segment is visible to the candidate location when there is no constraint of movement, such as walls or other obstacles, between the candidate location and the segment.

Among the segments that are visible to the candidate location, a segment that is closest (i.e., having the shortest orthogonal distance) to candidate location 30 among the visible segments is identified. If the orthogonal distance between candidate location 30 and the segment is smaller than a threshold, candidate location 30 is mapped to an updated candidate location on the segment. For example, the update candidate location can be the orthogonal projection of the candidate location onto the segment.

If the orthogonal distance between candidate location 30 and the segment is equal to or larger than the threshold, candidate location 30 is mapped to an updated candidate location that is closer to, but not on, the segment. For example, candidate location 30 can be shifted toward the segment along the orthogonal projection direction to the updated candidate location. The amount of shift toward the segment is determined by a weight value, which is in turn calculated according to a probability density function, described below.

In the example of FIG. 2A, segments 40 and 42 are not visible to candidate locations 30g, 30h, 30i, and 30j, so candidate locations 30g-30j are not updated in the pathway matching step.

Figure 2B:
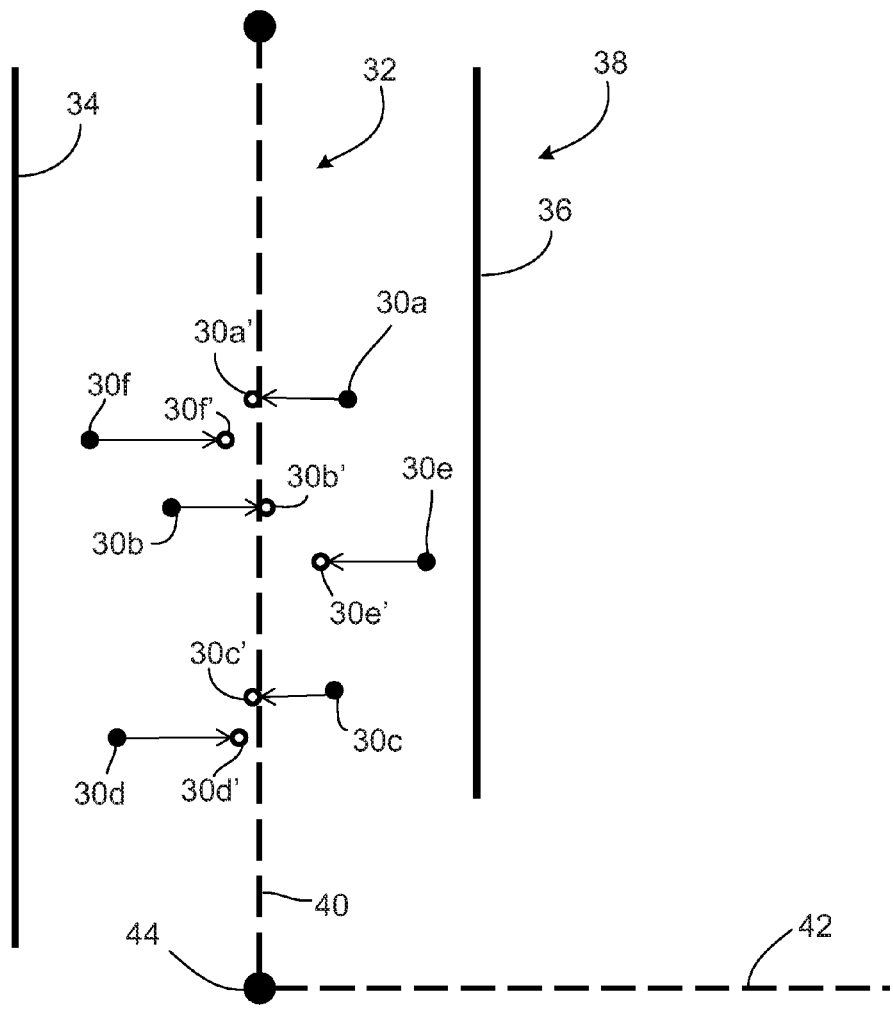

Referring to FIG. 2B, for candidate locations 30a, 30b, 30c, 30d, 30e, and 30f, segment 40 is closer than segment 42. Assume that for each of candidate locations 30a, 30b, and 30c, the distance between the candidate location and segment 40 is less than a predetermined threshold. Candidate locations 30a, 30b, and 30c are mapped to updated candidate locations 30a', 30b', and 30c', respectively, that are on segment 40. Assume that for each of candidate locations 30d, 30e, and 30f, the distance between the candidate location and segment 40 is greater than the predetermined threshold. Candidate locations 30d, 30e, and 30f are mapped to updated candidate locations 30e', 30f', and 30g', respectively, that are closer to, but not on, segment 40.

In the example of FIG. 2A, for candidate locations 30k, 30l, 30m, and 30n, due to wall 36, segment 40 is not visible to these candidate locations. The only segment visible to candidate locations 30k-30n is segment 42.

Figure 2C:
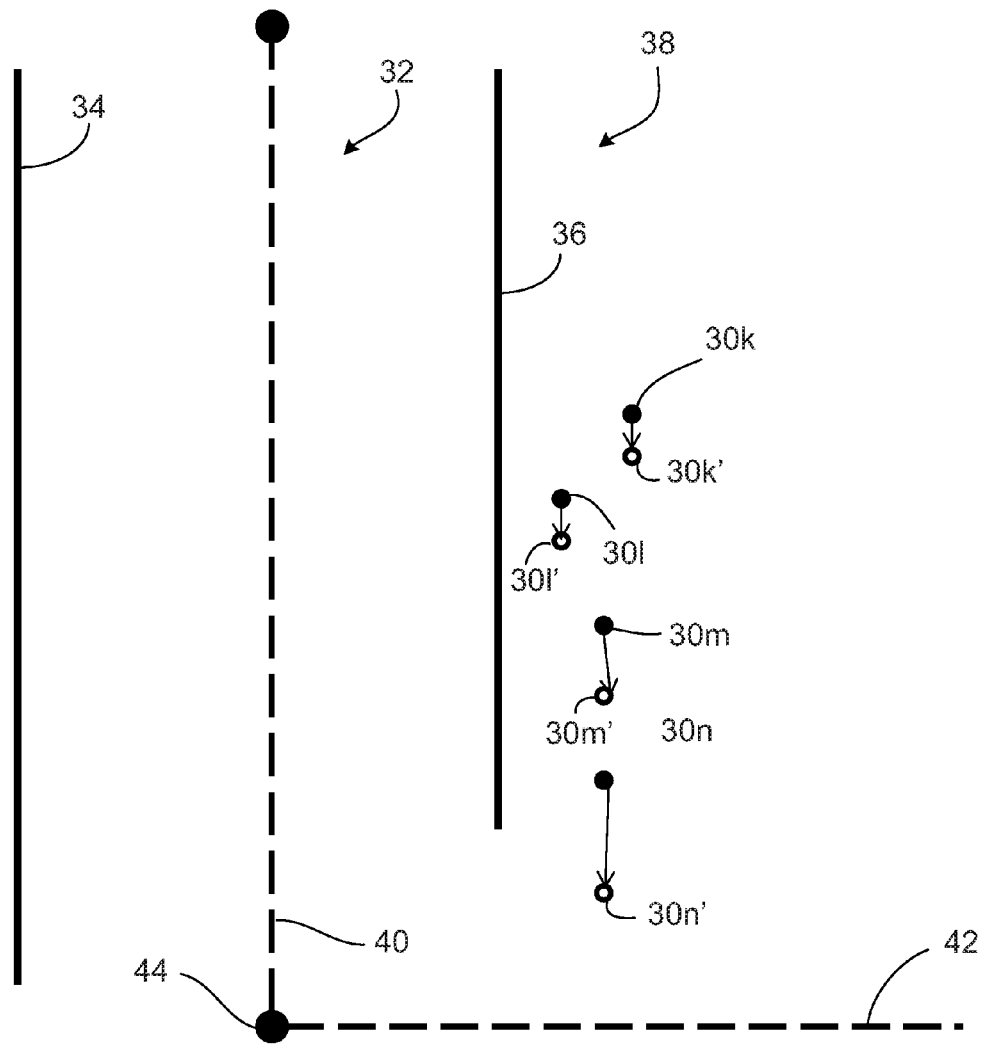

Referring to FIG. 2C, assume that for each of candidate locations 30k, 30l, 30m, and 30n, the distance between the candidate location and segment 42 is greater than the predetermined threshold. Candidate locations 30k, 30l, 30m, and 30n are mapped to updated candidate locations 30k', 30l', 30m', and 30n', respectively, that are closer to, but not on, segment 42.

Figure 2D:
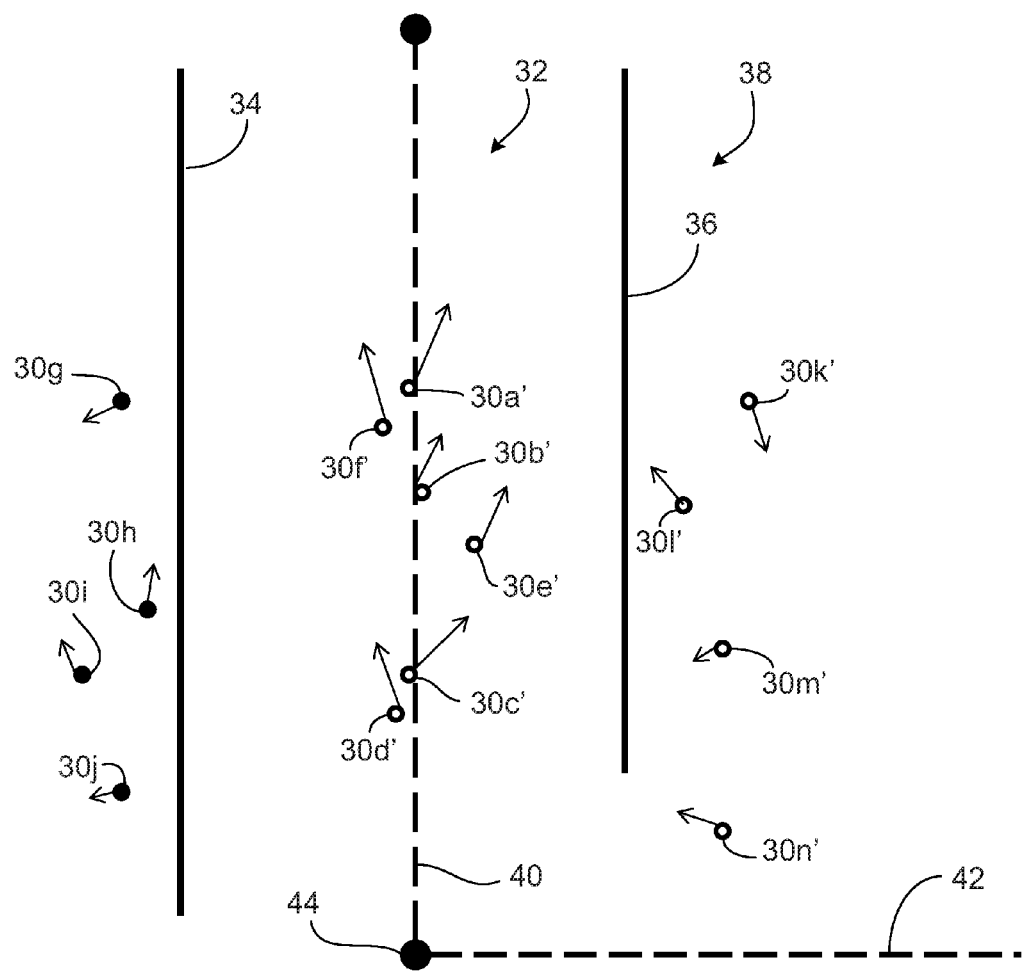

Referring to FIG. 2D, in the propagation step, candidate locations 30g, 30h, 30i, 30j, and updated candidate locations 30a', 30b', 30c', 30d', 30e', 30f', 30k', 30l', 30m', and 30n are propagated according to a stochastic process to further updated candidate locations. The arrows show the propagation of the candidate locations. The measurement step, pathway matching step, and the propagation steps can be repeated.

In some examples, the propagation of the candidate locations is not constrained by the pathway segments. This models the behavior of pedestrians who may wander off the pathways while walking in the venue. Some pathways may impose strict limits on pedestrians. For example, once a pedestrian steps onto a movable walkway in an airport, the pedestrian will likely stay on the movable walkway until the end of the walkway is reached. In this case, the state space model can be tightly coupled to the pathway constraint.

Figure 3:
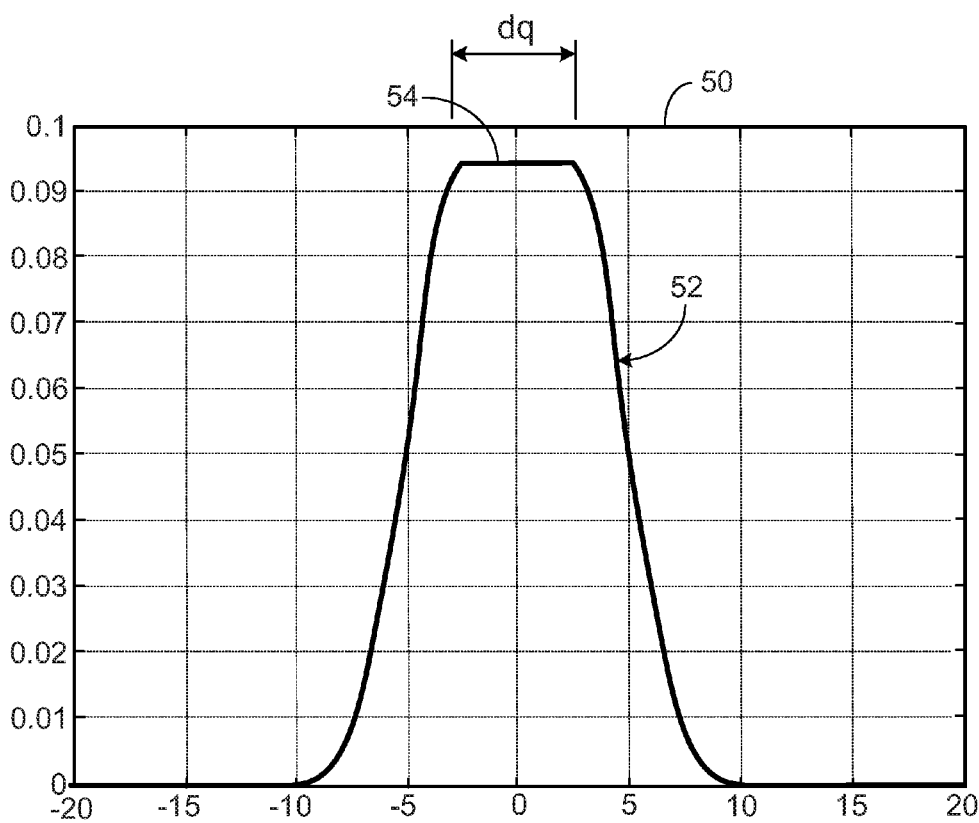
FIG. 3 is a graph of a probability distribution function used for pathway matching.

Referring to FIG. 3, in some implementations, a probability distribution function p(x) is used to model the probability distribution that when a pedestrian is estimated (e.g., by a location estimator described below) to be at a given distance x from a pathway, the likelihood that the pedestrian is actually on the pathway. In this example, probability distribution function p(x) can be represented as follows:

$$P(x) = \begin{cases} \dfrac{1}{dq + \sqrt{2.0 \cdot \pi \cdot \sigma^2}} & \text{if } |x| < dq/2 \\ \dfrac{1}{dq + \sqrt{2.0 \cdot \pi \cdot \sigma^2}} \cdot e^{-(|x|-dq/2)^2/(2.0 \cdot \sigma^2)} & \text{if } |x| \geq dq/2 \end{cases} \quad \text{(Equation 1)}$$

where dq represents a stretching parameter and δ represents the standard deviation. FIG. 3 shows graph 50 having curve 52 representing the probability distribution as a function of the distance x. Curve 52 has a flat (or stretched) portion 54 having the same probability value.

In some implementations, the stretching parameter dq and standard deviation δ for a given segment can be determined based on the type of the pathway. For example, a segment representing a hallway in an airport may be assigned a first set of dq and δ values, while a segment representing a hallway in an office building may be assigned a second set of dq and δ values. The stretching parameter dq and standard deviation δ for a given segment can also be determined based on survey. For example, a surveyor may observe whether pedestrians, when walking on a pathway, adhere closely or loosely to the pathway, and assign dq and δ values accordingly.

When a state space model is used to determine the location of a mobile device carried by the pedestrian, the probability density function p(x) can be used to determine whether a candidate location is mapped to an updated candidate location that is on the corresponding segment, or mapped to an updated candidate location that is closer to, but not on, the segment.

In some implementations, if the distance between the candidate location and the segment is less than dq/2, the candidate location is mapped to an updated candidate location that is on the segment. If the distance between the candidate location and the segment is equal to or greater than dq/2, the candidate location is mapped to an updated candidate location that is closer to, but not on, the segment.

Parameter dq is called a stretching parameter because a candidate location within a dq/2 distance of a segment is "snapped" or mapped onto the segment, as if the candidate location were connected to the segment by an elastic band, and the elastic band can stretch as far as dq/2. When the distance between the candidate location and the segment is less than dq/2, the stretched elastic band snaps the candidate location back onto the segment.

In the example of FIGS. 2A-2C, the parameter dq/2 corresponds to the predetermined threshold used to determine whether a candidate location is mapped to an updated location on a corresponding segment, or to an updated location closer to, but not on, the corresponding segment.

When the distance x between a candidate location and a corresponding segment is greater than dq/2, the candidate location is mapped to an updated candidate location that is closer to, but not on, the segment. The coordinates of the updated candidate location can be determined according to a weight value w, which is in turn calculated according to the probability density function p(x) in equation 1 according to the following equation:

$$w=p(x), \text{normalized with } p(0) \quad \text{(Equation 2)}$$

The weight value w can be used to determine the coordinates of the updated candidate position according to the following equations:

$$x\_updated=(1-w)*x\_particle+w*x\_projectionPoint$$

$$y\_updated=(1-w)*y\_particle+w*y\_projectionPoint \quad \text{(Equation 3)}$$

where the parameters are defined as follows:
- x_particle: x coordinate of the candidate location,
- y_particle: y coordinate of the candidate location,
- x_projectionPoint: x coordinate of the orthogonal projection of the candidate location onto the corresponding segment,
- y_projectionPoint is the y coordinate of the orthogonal projection of the candidate location onto the corresponding segment,
- x_updated: x coordinate of the updated candidate location, and
- y_updated: y coordinate of the updated candidate location.

When a candidate location is closer to the corresponding segment, the weight value will be higher, and the amount of shift as a percentage of the distance between candidate location and the segment will be larger. For example, suppose the distance between the candidate location and the segment is d. If the weight value w is 0.5, the updated candidate location will be at the middle between the candidate location and the orthogonal projection point. If the weight value w is 0.1, the candidate location will be shifted toward the orthogonal projection point on the segment by an amount equal to 10% of the distance d. If the weight value w is 0.8, the candidate location will be shifted toward the orthogonal projection point on the segment by an amount equal to 80% of the distance d.

In the example of FIG. 3, when the distance between the candidate position and the corresponding segment is greater than about 10, the amount of shift in the candidate location becomes small. This represents that when a pedestrian is far away from a pathway, it is likely that the pedestrian is not walking on the pathway at all.

The probability distribution function associated with a segment can be affected by several factors. For example, if a segment represents a hallway, the probability distribution function can be dependent on the width of the hallway. If the hallway is wider, the standard deviation σ in Equation 1 can be larger, representing the observation that pedestrians tend to spread out more when walking in a wider hallway. The probability distribution function may depend on a density of pathways in a vicinity of the segment. For example, if several pathways are provided in a hallway, the standard deviation σ in Equation 1 can be smaller, representing the observation that pedestrians tend to adhere to given pathways to avoid bumping into other pedestrians walking in adjacent pathways.

The following describes devices and systems for implementing the pathway matching discussed above.

Overview of System Implementing Pathway Matching

Figure 4:
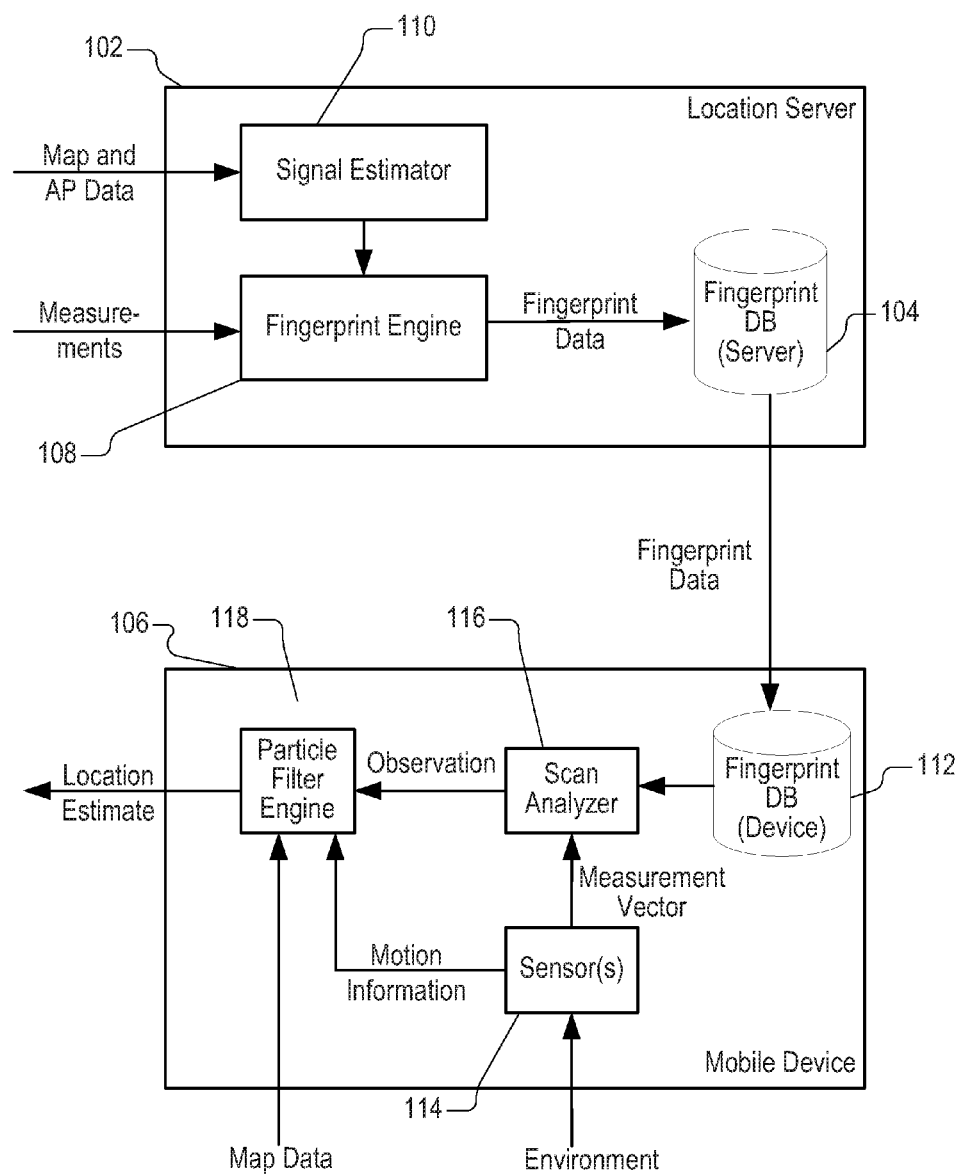
FIG. 4 is a block diagram providing an overview of location determination using location fingerprint data.

FIG. 4 is a block diagram providing an overview of location determination using pathway matching. Location server 102 can include one or more computers programmed to generate location fingerprint data and store the location fingerprint data in location fingerprint database 104. Location server 102 can provide the location fingerprint data to mobile device 106. Mobile device 106 can determine a location of mobile device 106 using the location fingerprint data received from location server 102.

The location fingerprint data generated by location server 102 can include a set of features associated with a venue. The venue can be a space accessible by a pedestrian. The venue can include one or more constraints limiting the pedestrian's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator). The venue can be a physical structure. The physical structure can be closed (e.g., a building) or open (e.g., an open stadium). The space can be indoor space inside of the physical structure, or space inside of a bounding space of the physical structure if the physical structure is open. The venue can be mobile (e.g., an airplane, a cruise ship, or a mobile oil platform).

For example, a venue can be a multi-story office building having a lobby, offices, walls, doors, elevators, and hallways. A pedestrian can be a human or a device that moves at a speed that is similar to a human's walking or running speed.

Location server 102 can generate the location fingerprint data by designating measurements of environment variables as the set of features associated with a venue. The environment variables can be signals from one or more signal sources. The measurements of environment variables can include data obtained through one or more Wi-Fi™ access point radio frequency (RF) scans. The data can include service set identifier (SSID) or received signal strength indicator (RSSI). The measurements of environment variables can include magnetic field properties, including static and dynamic properties. For example, the measurements can include a magnitude and a direction of a magnetic field and their respective rate of change. The measurements of environment variables can include Bluetooth™ scan data, e.g., an identifier or RSSI. The measurements of environment variables can include cellular data, e.g., cell identifier or RSSI. The measurements of environment variables can include vision-based features, e.g., light intensity, color, or visual features determined by a feature recognition device. The measurements of signals can include measurement of near field communication (NFC) signals or radio frequency identification (RFID) signals.

Location server 102 can generate location fingerprint data using fingerprint engine 108. Fingerprint engine 108 can generate the location fingerprint data using survey or prediction. To generate location fingerprint data using survey, fingerprint engine 108 can receive crowd-sourced data, or survey data, from one or more sampling devices. Fingerprint engine 108 can generate the location fingerprint data based on the received crowd-sourced data using interpolation. The crowd-sourced data can include measurements of environment variables submitted by the one or more sampling devices. Each sampling device can be a mobile device having a sensor (e.g., an RF receiver) for measuring an environment variable (e.g., an RF signal) and configured to provide the measurement to fingerprint engine 108. To measure the signal, the sampling device can be programmed to record detectable signals while being placed at various sampling points. For example, a user or a vehicle can carry the sampling device and walk or otherwise travel (e.g., move up or down with an elevator) inside of venue (e.g., a building). Meanwhile, the sample device can record measured signals, and submit the recorded signals to location server 102 in real time or in batches. The recorded signals can be from diverse signal sources. For example, the recorded signals can include some or all of magnetic field measurements, RF measurements, and light measurements. The recorded measurements and interpolation can be associated with the venue.

To generate location fingerprint data using prediction, fingerprint engine 108 can use predicted signal measurements generated by signal estimator 110. Predication can include extrapolation using truth data on access points. The truth data can include known locations of the access points. Signal estimator 110 can be a component of location server 102 that is configured to generate estimated signal measurements based on a map (or other structural information specifying signal barriers) of a venue and the known locations of signal sources in the venue. Signal estimator 110 can receive the map, the locations, and attributes of signal sources. Signal estimator 110 can determine an estimated signal measurement at a given location based on attributes of the signal sources, locations of the signal sources, and features in the map. For example, signal estimator 110 can determine one or more sampling points in a venue, and determine a distance between a sampling point and a wireless access point. Based on a type, make, or model of the wireless access point, signal estimator 110 can determine a signal strength of the access point. Based on number of walls between the sampling point and the access point, signal estimator 110 can determine an attenuation of signal from the access point. Using the signal strength and attenuation, signal estimator 110 can determine the estimated measurement (e.g., RSSI) at the sampling point and provide the estimated measurement and coordinates of the sampling point to fingerprint engine 108.

Location server 102 can send location fingerprint data to mobile device 106 upon receiving a request from mobile device 106. Mobile device 106 can send the request to location server 102 on an as-needed basis, for example, when mobile device 106 enters a venue. Mobile device 106, upon receiving the location fingerprint data, can store the location fingerprint data in location fingerprint database 112. Mobile device 106 can obtain a set of measurements of environment variables (e.g., results from one or more Wi-Fi™ scans) using sensors 114. Sensors 114 can send the measurements to scan analyzer 116 as measurement vectors. Scan analyzer 116 can be a component of mobile device 106 configured to derive a highest probable location of mobile device 106 based on the measurement vectors and location fingerprint data. Mobile device 106 can use scan analyzer 116 to match readings in the measurement vectors from sensors 114 against location fingerprint data stored in location fingerprint database 112. The match can be multidimensional. For example, the match can be performed on a signal source dimension (measurement of signal source 1, measurement of signal source 2 . . . ) and a location dimension (e.g., latitude, longitude, and altitude). The match can include a statistical classification of the measurement vectors where the location fingerprint data are training data for the statistical classification. Scan analyzer 116 can derive the highest probable location as a function of the multidimensional match.

In some implementations, scan analyzer 116 can designate the highest probable location as a location observation, and provide the location observation to particle filter engine 118. Particle filter engine 118 is a component of mobile device 106 configured to use available data to estimate a current location of mobile device 106. Particle filter engine 118 can determine an initial location of mobile device 106, for example, by using random location in the venue or using a first observation. In addition, particle filter engine 118 can receive from sensors 114 motion information of mobile device 106. Using the motion information and a map of the venue, particle filter engine 118 can configure parameters of a particle filter to model candidate locations of mobile device 106. Particle filter engine 118 can then update the particle filter using the location observation from scan analyzer 116. Updating the particle filter can include determining a current location estimate based on a past location estimate and the observation. A pathway matching step is performed to update candidate locations based on information about pathways in the venue. Some of the candidate locations are mapped to nearby segments of pathways, or shifted toward the segments. The current location estimate can be determined using a probability density function on the candidate locations. Particle filter engine 118 can provide a representation of current location estimate as an output for display to a user of mobile device 106.

Generating Location Fingerprint Data

Figure 5:
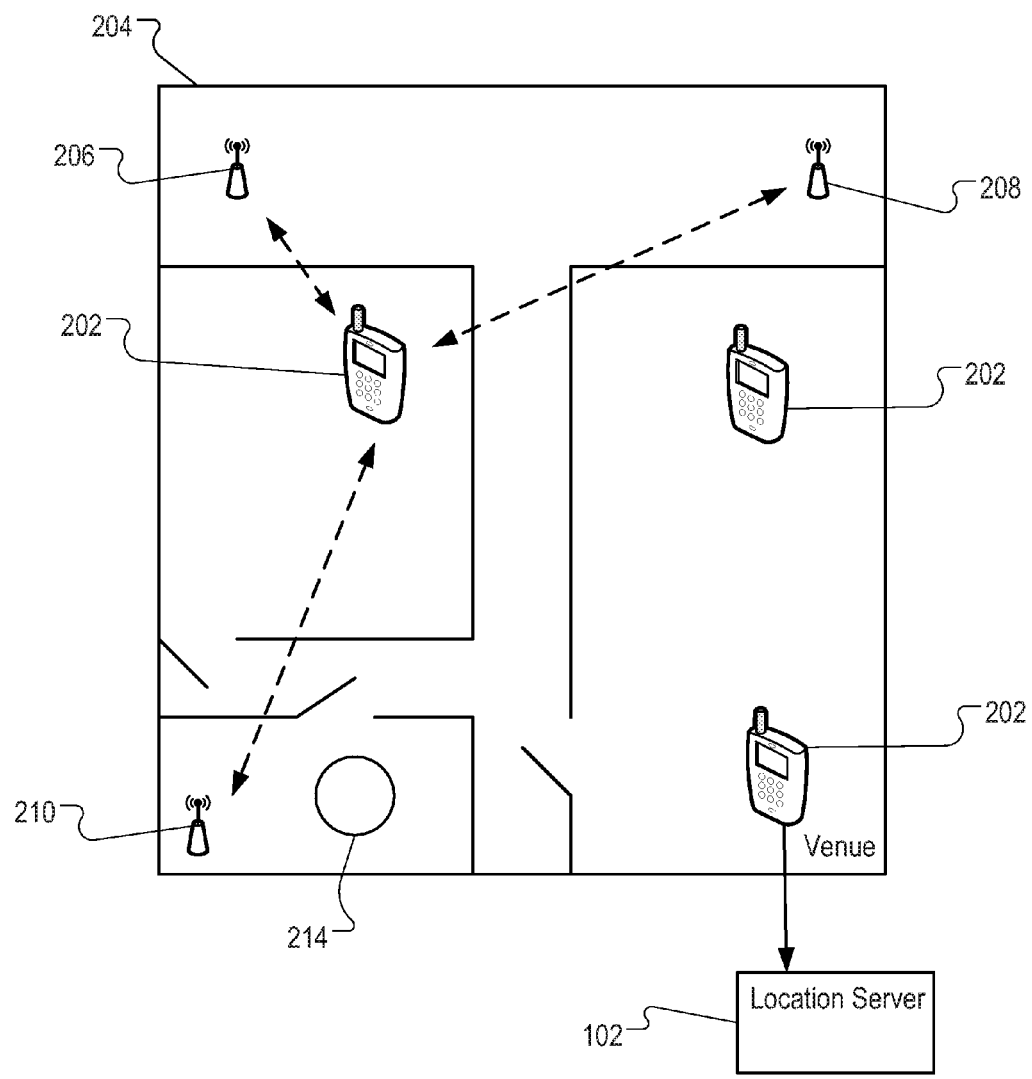
FIG. 5 illustrates exemplary survey techniques for generating location fingerprint data.

FIG. 5 illustrates exemplary survey techniques for generating location fingerprint data. Sampling device 202 can survey available features of venue 204. Surveying venue 204 can include measuring one or more environment variables using a sensor of sampling device 202. Each environment variable can be a radio signal characteristic, a magnetic field intensity or direction, a temperature, a sound level, a light intensity or color. The environment variables can include signals from signal sources 206, 208, and 210. Signal sources 206, 208, and 210 can transmit signals that are detectable by sampling device 202 inside of venue 204. Signal sources 206, 208, and 210 need not be physically located in venue 204.

Sampling device 202 can be carried to various sampling points in venue 204. Sampling device 202 can determine the sampling point based on a user input on a map of venue 204 displayed on sampling device 202. At each sampling point, sampling device 202 can record a sensor reading measuring signals from one or more signal sources. For example, if signal sources 206, 208, and 210 are wireless access points, sampling device 202 can record SSID received from the access points, and record RSSI from each wireless access point when sampling device 202 can detect a wireless signal from each wireless access point (as indicated in dashed lines in FIG. 5). Sampling device 202 can designate the measurement at each sampling point as a measurement vector of the sampling point. At each sampling point, sampling device 202 need not detect signals from all signal sources to generate the measurement vector for a sampling point. Sampling device 202 can send the measurement vectors to location server 102 as survey data for additional processing.

Venue 204 may include space 214 for which no sampling data exist. Space 214 can be a space not reached by sampling device 202, or a space where sampling device 202 moved through without staying long enough to obtain a reading of the signals. Fingerprint engine 108 of location server 102 can determine measurements at space 214 through interpolation or extrapolation. Additional details of operations of fingerprint engine 108 will be described below in reference to FIG. 6.

Figure 6:
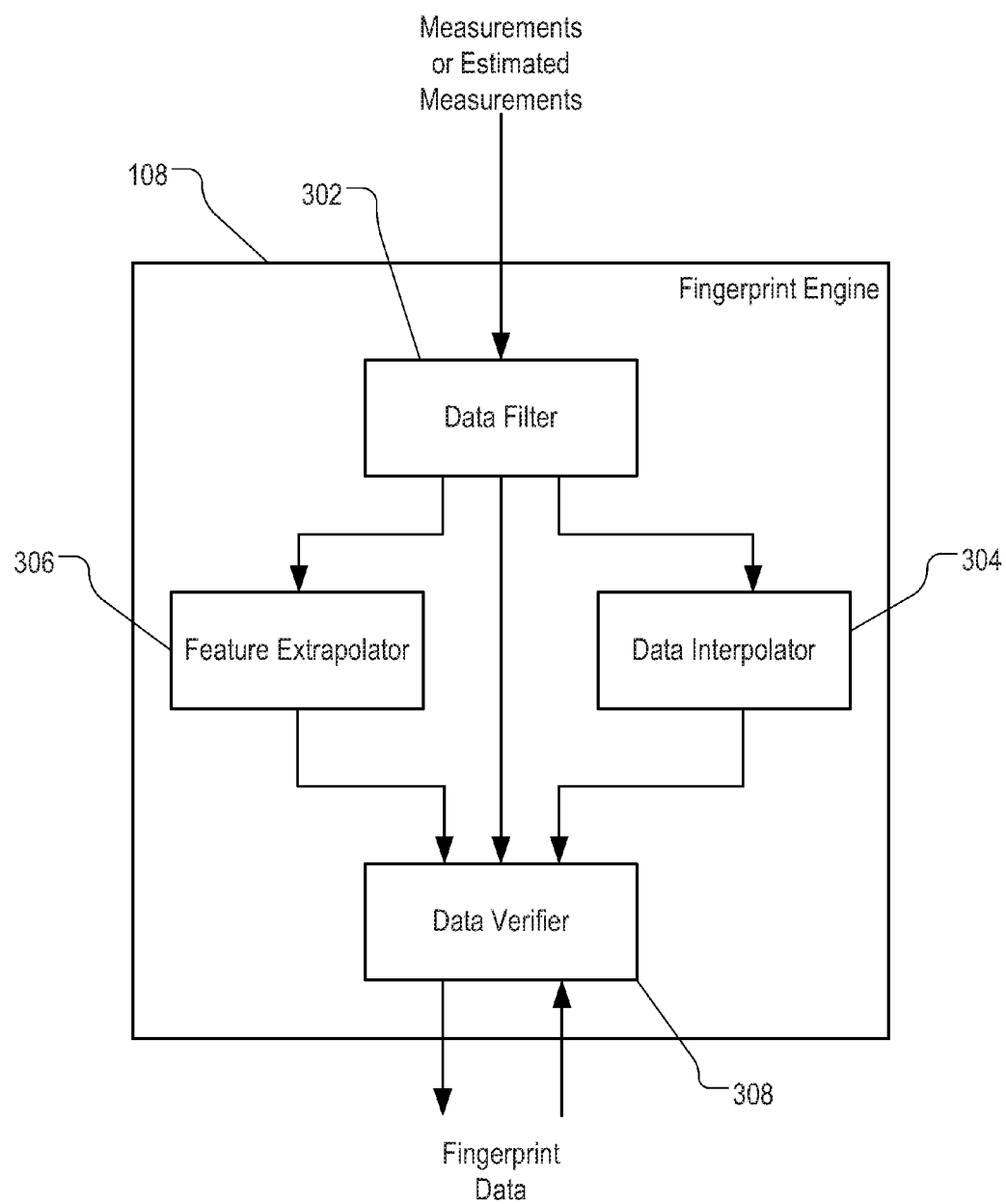
FIG. 6 is a block diagram of an exemplary fingerprint engine for generating location fingerprint data.

FIG. 6 is a block diagram of exemplary fingerprint engine 108 for generating location fingerprint data. Fingerprint engine 108 can be programmed to receive survey data from one or more individual sampling devices (e.g., sampling device 202 of FIG. 5) and generate the location fingerprint data based on the received survey data. Fingerprint engine 108 can include data filter 302. Data filter 302 is a component of fingerprint engine 108 configured to pre-process the received survey data. Pre-processing the survey data can include discarding abnormal survey data (e.g., incomplete readings or outliers) and compensating for differences among different sampling devices.

Fingerprint engine 108 can include data interpolator 304. Data interpolator 304 is a component of fingerprint engine 108 configured to up-sample a feature resolution. Data interpolator 304 can determine that the survey data are sparse, and apply an interpolation scheme in the up-sampling.

Fingerprint engine 108 can include feature extrapolator 306. Feature extrapolator 306 is a component of fingerprint engine 108 configured to determine whether a confidence value of a specific feature satisfies a threshold and to extrapolate a feature from survey data if the threshold is satisfied. The feature can reflect a characteristic of signals received at a given sampling point.

Fingerprint engine 108 can include data verifier 308. Data verifier 308 is a component of fingerprint engine 108 configured to maintain integrity of the features by verifying a feature derived from survey data against one or more existing features stored in location fingerprint database 104. Data verifier 308 can verify that each feature at a given venue that has a given set of constraints can yield at least one matching result at a high degree of confidence. Data verifier 308 can facilitate maintaining location fingerprint database 104, including keeping location fingerprint database 104 up to date. In addition, data verifier 308 can evaluate integrity of location fingerprint database 104 by determining uniqueness of location fingerprint database 104 as a function of spatial difference.

Figure 7:
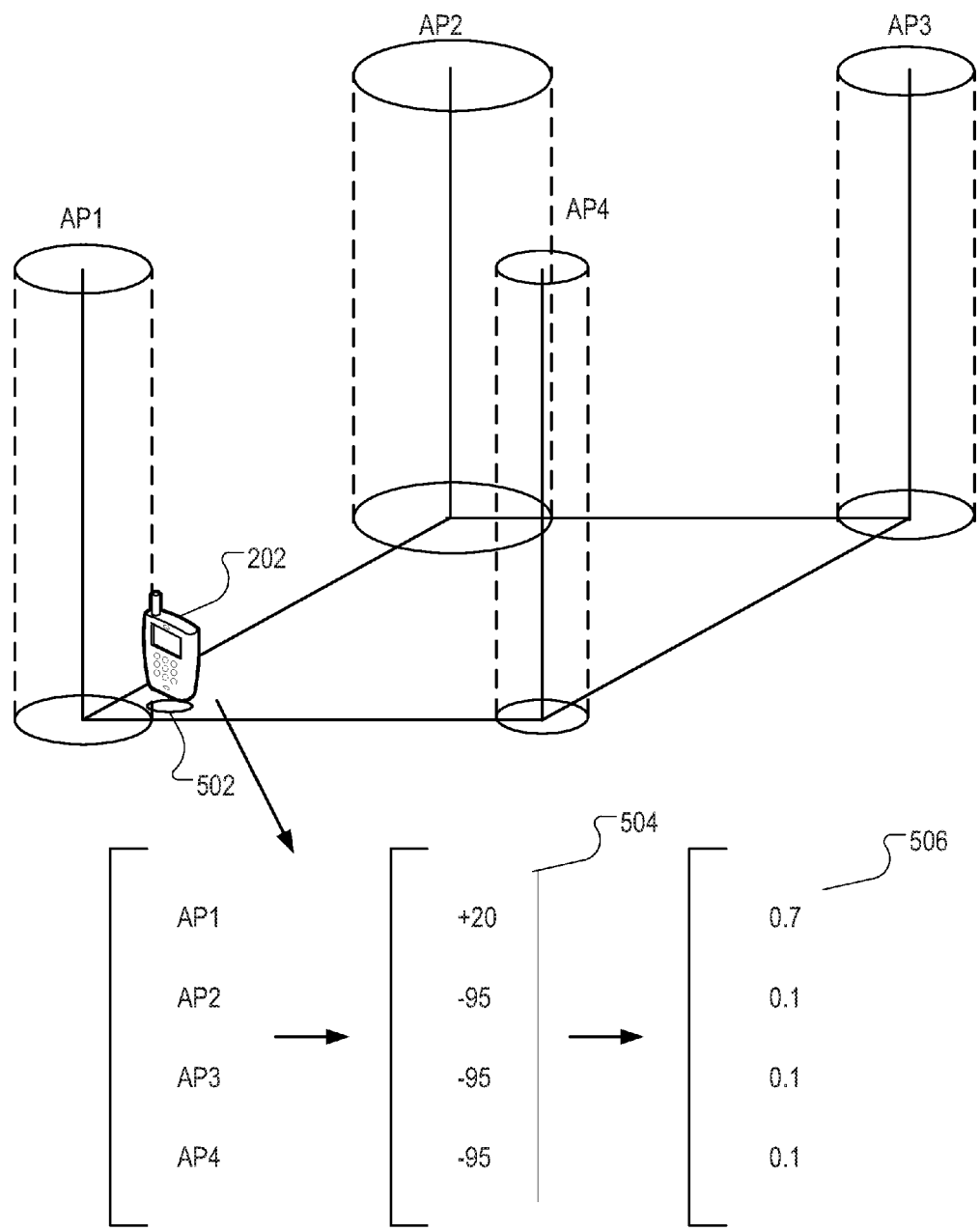
FIG. 7 illustrates an exemplary feature vector in location fingerprint data.

FIG. 7 illustrates an exemplary feature vector in location fingerprint data. Sampling device 202 can conduct a survey in a venue. Sampling device 202 can detect four signal sources when sampling device 202 is inside of the venue. Each of the four signal sources can be a wireless access point. Each of the four signal sources can have an identifier, e.g., a media access control (MAC) address. The identifiers can be, for example, AP1, AP2, AP3, and AP4, respectively. A height of each vertical line in FIG. 7 represents a measured signal strength. In this example, the vertical lines have equal height, and each corresponds to a circle. Each circle around a signal source represents a measurement (e.g., RSSI) of the corresponding signal source that is equal to a measurement represented (e.g., 20 dB) by the height of the vertical line. A circle (e.g., the one around AP2) can be larger than another one (e.g., the one around AP4). The different in size can indicate that sampling device 202 can receive signals having a same signal strength in a larger area around one signal source (AP2) than around another signal source (AP4).

At location 502, sampling device 202 can detect signals from AP1, AP2, AP3, and AP4. The signal strength of the signals from AP1, AP2, AP3, and AP4 can be +20 dB, −95 dB, −95 dB, and −95 dB, respectively. Sampling device 202 can submit the signal strengths as measurement vector 504 to location server 102. Location server 102 can determine feature vector 506 based on measurement vector 504. Feature vector 506 can have multiple elements, each element corresponding to a signal source. A value of each element can indicate a probability that the corresponding signal source is detectable by a mobile device. Feature vector 506 can be derived from measurement vector 504. Feature vector 506 can indicate that some measurements may bear more information than other measurements. For example, if at a given location, four access points AP1, AP2, AP3, and AP4 are detected, whereas signals from one access point (AP1) is very strong compared to signals from the other three access points. Location server 102 can determine that a strong RSSI measurement can only be observed in a spatially limited region, and accordingly, strong access point AP1 can have higher information content (entropy) than AP2, AP3, and AP4. For example, location server 102 can assign entropy values 0.7, 0.1, 0.1, and 0.1 to AP1 through AP4, respectively. Feature vector 506 can be associated with location 502, indicating that, at location 502, a mobile device is likely to detect a signal from AP1, but unlikely to detect signals from AP2, AP3, and AP4. Location server 102 can store feature vector 506 in a location fingerprint database as a portion of the location fingerprint data associated with the venue surveyed by sampling device 202.

In some implementations, location server 102 can designate a feature vector as a good feature vector when a measurement pattern indicates a high probability that sampling device 202 is located proximate to a given signal source. Location server 102 can designate a feature vector as a good feature vector based on factors including observed power level or existence of a given frequency, among other factors. In the example shown, when location server 102 receives measurement vector 504, location server 102 can determine sampling device 202 has a high likelihood of being close to AP1, if an area around AP1 where a device can measure an RSSI of 20 dB is small. Accordingly, location server 102 can designate feature vector 506 as a good feature vector. A good feature vector can be associated with higher weight in location determination by a mobile device.

Exemplary Location Fingerprint Data

Figure 8:
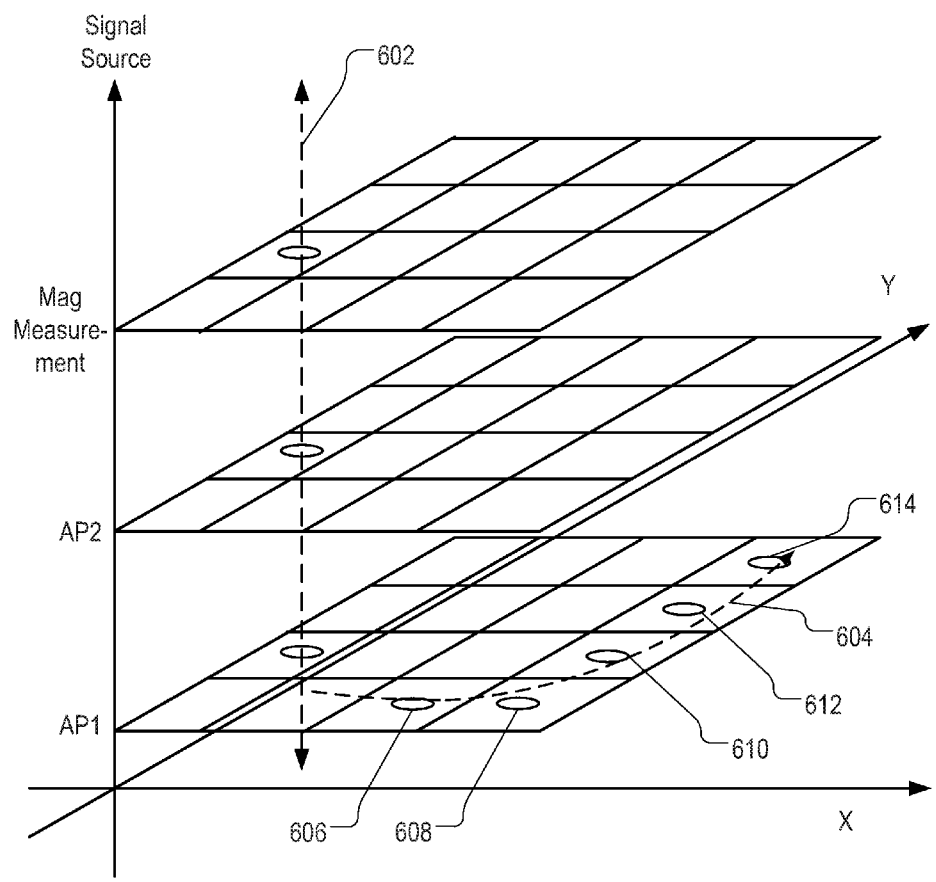
FIG. 8 illustrates an exemplary logical structure of a location fingerprint database.

FIG. 8 illustrates an exemplary logical structure of a location fingerprint database. Location fingerprint data can include, for each location among multiple locations in a venue, at least one of measurements (or lack of measurements thereof) of various signal sources, expected measurements of the signal sources, variance of the expect measurements, and a feature vector. For example, location fingerprint data can include at least one of: wireless access point fingerprint data; RFID fingerprint data; NFC fingerprint data; Bluetooth™ fingerprint data; magnetic field fingerprint data; cellular fingerprint data; or computer vision fingerprint data. The various fingerprint data can be aggregated to form the location fingerprint data for a given location.

Location fingerprint data can be stored as multi-dimensional data in association with a venue. Some of the dimensions of the multi-dimensional data can be space dimensions. The space dimensions can include X (e.g., latitude), Y (e.g., longitude), and Z (e.g., altitude, not shown). The space dimension can be continuous, expressed in a function, or discrete, where the space dimension can include locations (e.g., locations 606, 608 610, 612, and 614) distributed in the venue. The distribution can be even and uniform, or concentrated around areas where good feature vectors exist.

At least one dimension of the multi-dimensional data can be a signal source dimension. Feature vector 602 can correspond to a location represented by (X, Y, Z), and have one or more values of each signal source. The values can include one or more of an expected value of an environment variable (e.g., an expected RSSI), a variance of the expected value, or a probability that a mobile device can detect the signal from the signal source. Fingerprint engine 108 of location server 102 can determine the expected value and variance based on measurements and variance of the measurements received from a sampling device (e.g., sampling device 202 of FIG. 5). The measurements can be diverse. For example, the signal source dimension can include dimension variables AP1, AP2, and a magnetic field measurement.

In some implementations, the space dimensions can be normalized. Fingerprint engine 108 can receive measurements from one or more sampling devices. Each measurement can correspond to a sampling point. For example, a surveyor can carry the sample device and follow path 604 to survey a venue. Fingerprint engine 108 can normalize path 604 to locations 606, 608 610, 612, and 614 according to distribution of 606, 608 610, 612, and 614.

Exemplary Location Estimate

Figure 9:
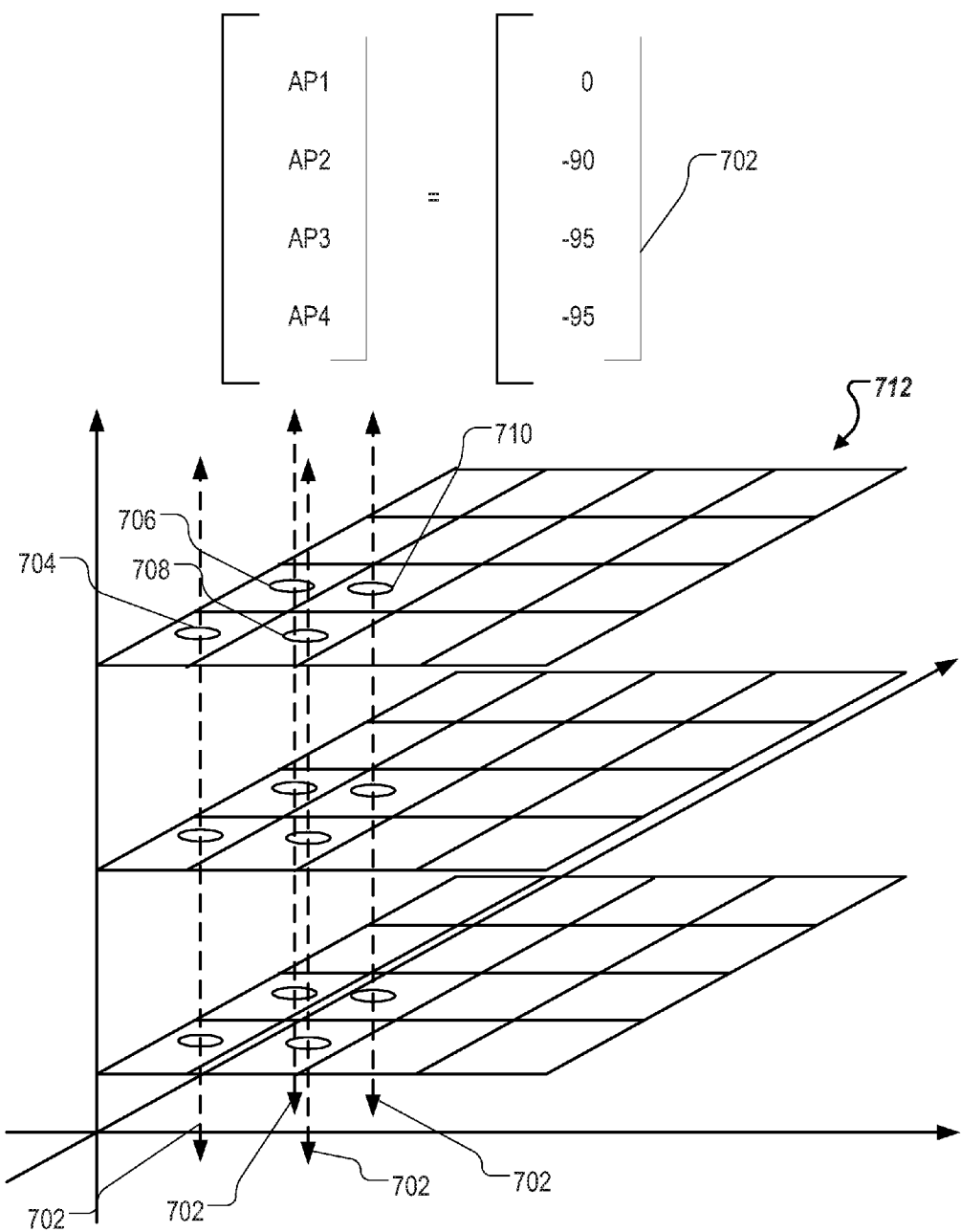
FIG. 9 illustrates exemplary techniques of estimating a current location using statistical classification.

FIG. 9 illustrates exemplary techniques of estimating a current location using statistical classification. Mobile device 106 (of FIG. 4) can receive location fingerprint data 712 from location server 102. Location fingerprint data 712 can be associated with a venue. Location fingerprint data 712 can include all data in a location fingerprint database specific for the venue. Mobile device 106 can match multi-dimensional measurement vector 702 derived from one or more sensors 114 against location fingerprint data 712 to derive a highest probable location of mobile device 106 at the venue. The highest probable location can be a function of multi-dimensional measurement vector 702.

Scan analyzer 116 of mobile device 106 can determine the highest probable location of mobile device 106 using an adaptive scheme between statistical classification and regression. In the statistical classification, scan analyzer 116 can identify to which locations in a set of locations (e.g., locations 704, 706, 708, or 710 of the venue) a vector of sensor measurements belong based on training data. The set of locations can be estimated locations of mobile device 106. The vector of sensor measurements can include multi-dimensional measurement vector 702. The training data can include measurements associated with known locations. Scan analyzer 116 can use location fingerprint data 712 as the training data.

Scan analyzer 116 of mobile device 106 can employ a point-wise kernel estimation procedure to determine a category of multi-dimensional measurement vector 702. The category can be location 704, 706, 708, or 710. Scan analyzer 116 can determine a probability density function (PDF) of a location of mobile device 106 among locations 704, 706, 708, and 710. To determine the PDF, scan analyzer 116 can determine a probability that multi-dimensional measurement vector 702 is located at each of locations 704, 706, 708, and 710 by applying a kernel function to a difference between multi-dimensional measurement vector 702 and respective feature vectors or measurement vectors corresponding to locations 704, 706, 708, and 710. Scan analyzer 116 can apply a symmetric function that integrates to one (e.g., a Gaussian function, uniform function, or cosine function) as a choice of the kernel function for the point-wise kernel estimation.

Scan analyzer 116 can employ the feature vector in the kernel estimation procedure. In some implementations, the feature vector can use a derived entropy vector. Scan analyzer 116 can use the feature vector to increase significance of an access point the signals from which measure strong. The entropy vector can include as elements entropy of each subset of the locations. Scan analyzer 116 can use the entropy vector to express information content of multi-dimensional measurement vector 702. Scan analyzer 116 can determine that a subset of multi-dimensional measurement vector 702 having lower readings (e.g., lower RSSI measurements) possesses a lower information content than a subset of multi-dimensional measurement vector 702 having higher readings (e.g., higher RSSI measurements) possesses. The determination can indicate that, for a venue, a subset of regions having low readings can be greater than a subset of regions having higher readings.

In some implementations, scan analyzer 116 can optimize the determination by reducing a search space. A search space can correspond to a location of a mobile device and an uncertainty associated with the location. Scan analyzer 116 can start from an initial estimate, which can be designated as an initial search space. For example, when scan analyzer 116 has no information on location of mobile device 106, scan analyzer can designate the world as the initial search space. When scan analyzer 116 obtain some location information, scan analyzer 116 can reduce the search space to the United States, the state of California, the city of Cupertino, or a particular street block or building, based on the location information. Each location estimate can be derived from the estimate before.

Reducing the search space can include reducing, when possible, a number of discrete points (e.g., locations) for calculating probabilities in the PDF. Scan analyzer 116 can execute the kernel function in an a priori domain provided to scan analyzer 116. The a priori domain can be an a posteriori state estimate at time k given observations up to and including at time k by particle filter engine 118. For example, particle filter engine 118 can determine that, based on a constraint of the venue (e.g., a wall) and a limit of a speed of movement of mobile device 106 (to a maximum speed of a human walking or running), location 710 is not a possible location and shall be filtered out. Scan analyzer 116 can then determine a location observation based on probability densities on locations 704, 706, and 708. The a priori domain can be associated with uncertainty, which may increase or decrease. For example, in an attempt to reduce the search space, mobile device 106 can lose signals, causing location uncertainty and search space to increase.

Figure 10:
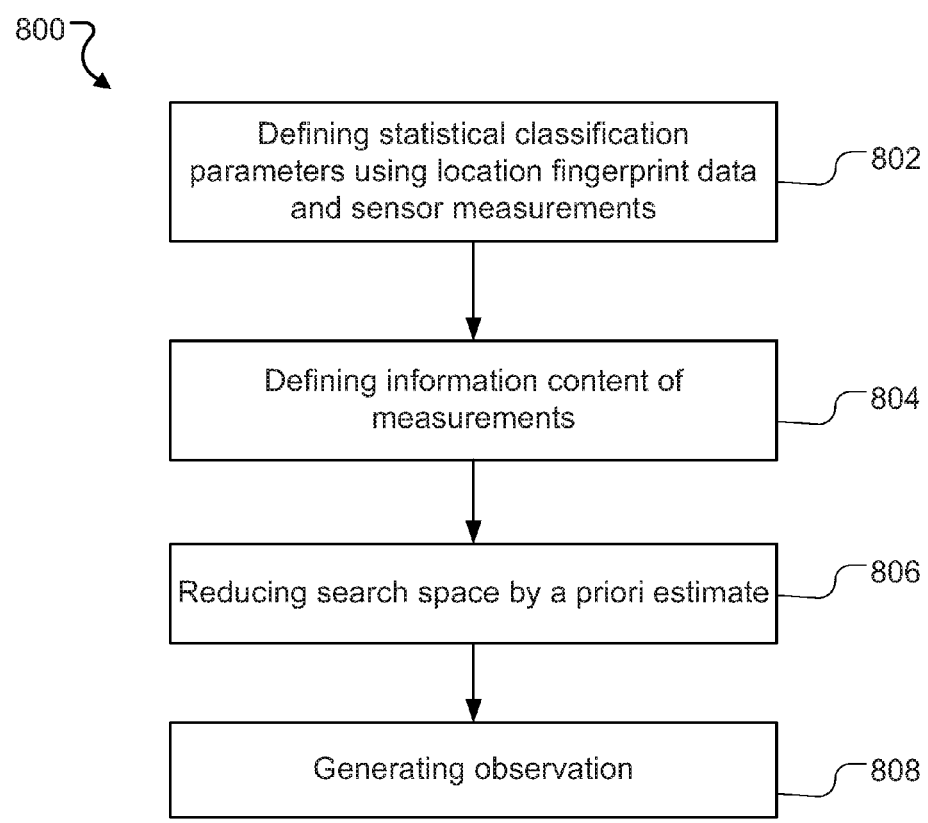
FIG. 10 is a flowchart of an exemplary procedure of generating a location observation using kernel estimation.

FIG. 10 is a flowchart of exemplary procedure 800 of generating a location observation using kernel estimation. Procedure 800 can be performed by exemplary scan analyzer 116 as described above in reference to FIG. 4.

Scan analyzer 116 can define (802) statistical classification parameters using location fingerprint data and sensor measurements. Scan analyzer 116 can define classification categories, a sample vector, and training data for the statistical classification. The classification categories can be one or more candidate locations of mobile device 106. The candidate locations can be one or more locations in a location fingerprint database. The sample vector can be multi-dimensional measurement vector 702 received from one or more sensors. The training data can be vectors stored in the location fingerprint database. Scan analyzer 116 can map the sample vector into the location categories (or "bins"). The mapping can be classification or regression. Classification can include a strict association where the sample vector is mapped into exactly one bin. Regression can include a derived association, where the sample vector is mapped into multiple bins. In regression, scan analyzer 116 can derive a final category of the sample vector by performing statistical analysis on the multiple bins.

Scan analyzer 116 can define (804) information content of measurements. Defining information content of measurements can include determining a weight of each measurement in the multi-dimensional measurement vector by applying a feature vector (e.g., an entropy vector).

Scan analyzer 116 can reduce (806) search space by a priori estimate. Reducing the search space can include executing a kernel function over an a priori domain, which can be an a posteriori state estimate provided to scan analyzer 116 by particle filter engine 118.

Scan analyzer 116 can generate (808) a location observation. Generating the location observation can include performing a point-wise kernel estimation procedure to estimate of a PDF of location of mobile device 106 in the reduced search space. Generating the location observation can include aggregating statistics out of a set of most likely matches according to the PDF. Scan analyzer 116 can provide the location observation to particle filter engine 118 for estimating a current location of mobile device 106.

Exemplary Particle Filter

Figure 11:
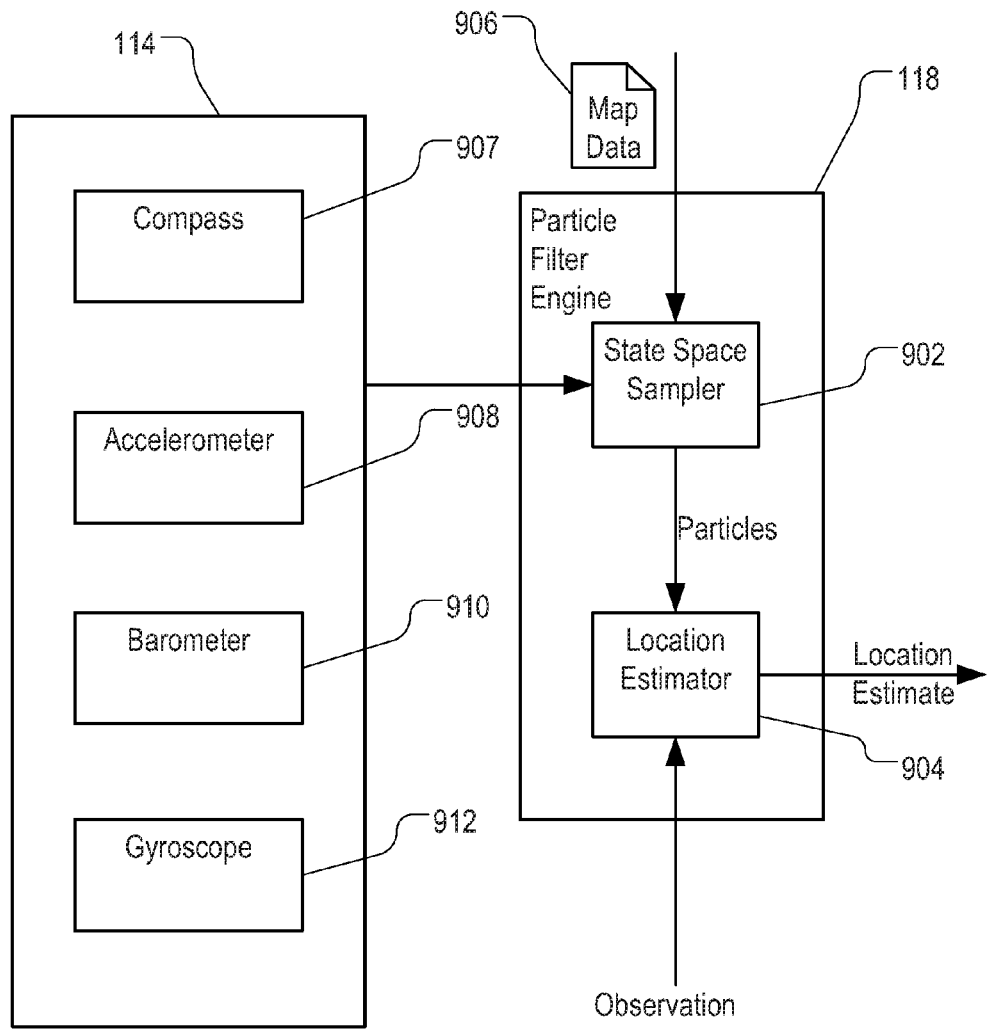
FIG. 11 is a block diagram illustrating an exemplary mobile device estimating a current location using a particle filter.

FIG. 11 is a block diagram illustrating an exemplary mobile device estimating a current location using a particle filter. The mobile device can be mobile device 106 as described in reference to FIG. 4.

Mobile device 106 can use "available information" to estimate a location when GPS signals are unavailable. The available information can include, for example, motion models, motion measurements, environmental constraints, and map constraints. Mobile device 106 can then use a state space model to fuse available information from different information sources.

The state space model can be a simulation-based estimation model, e.g., a particle filter. Particle filter engine 118 of mobile device 106 can estimate a probability density of current locations $X_k$ of mobile device 106 using the particle filter based on a previous location $X_{k-1}$ conditioned upon a current observation $Z_k$, where k is a given point in time, k−1 is a point prior to k in time. The time length between k and k−1 can be configurable (e.g., one second or five seconds).

Particle filter engine 118 can include state space estimator 902. State space estimator 902 can be configured to receive available information and fold the available information into location estimator 904, which is a component of particle filter engine 118 configured to provide a location estimate.

State space estimator 902 can receive, from a storage device of a server or of mobile device 106, map data 906. Map data 906 can include attributes of one or more constraints in a venue that includes a space accessible by a pedestrian carrying mobile device 106. The constraints can include structural constraints (e.g., walls). State space estimator 902 can determine that the pedestrian cannot transition through the structural constraint. State space estimator 902 can determine a likelihood where the pedestrian may move within a given time interval, given limited motion speed of the pedestrian.

The constraints in map data 906 can include attributes of regions in the space of the venue. For example, the constraints in map data 906 can define pathways (e.g., hallways) and an open area (e.g., a lobby, a cafeteria, or an office). The pathways can be represented by a path network including segments connected by joints. State space estimator 902 can determine that, when a pedestrian walks in the pathway, the pedestrian is likely to adhere to the pathway, whereas when the pedestrian walks in the open area, the pedestrian can float, e.g., move in random directions, without adhering to a pathway. State space estimator 902 can determine that the movement of the pedestrian is subject to constraint probabilities. For example, state space estimator 902 can determine a probability that the pedestrian enters an open space that opens to a pathway when a pedestrian is walking along a pathway. The probability that the pedestrian enters the open space can be higher or lower than a probability that the pedestrian stays on the pathway, based on a type of the open space (e.g., whether the open space is a lobby, a cafeteria, or an office) or a relative position of the pathway and the open space (e.g., whether the pathway ends at the open space). Additional details on determining limits on likelihood of where the pedestrian may move within a given time interval will be described below in reference to FIG. 12.

State space estimator 902 can receive, from sensors 114, a motion context. The motion context can include readings of sensors 114. Sensors 114 can include micro-electromechanical systems (MEMS) of mobile device 106. For example, sensors 114 can include compass 907 configured to determine a direction of a pedestrian's heading, accelerometer 908 configured to determine whether a pedestrian's movement is walking or running, a pace of the movement, and a stride of the movement. Sensors 114 can include barometer 910 configured to determine whether a pedestrian is moving upwards or downwards (e.g., in an elevator or on stairs) based on air pressure. Sensors 114 can include gyroscope 912 configured to determine whether a pedestrian is turning.

Based on the motion context, state space estimator 902 can determine if a pedestrian carrying mobile device 106 is stationary or non-stationary. If state space estimator 902 determines that the pedestrian is stationary, state space estimator 902 can configure location estimator 904 using state space system noise (e.g., random locations). If state space estimator 902 determines that the pedestrian is non-stationary, state space estimator 902 can configure location estimator 904 using motion speed of the pedestrian to drive state space update of location estimator 904.

State space estimator 902 can determine attitude information based on the motion context data received from sensor 114. The attitude information can include a heading of the pedestrian determined using a series of motion context data received from sensor 114. State space estimator 902 can receive the series of motion context data over time, and estimate a heading based on the series of motion context data using a filter configured to use a series of measurements observed over time to produce estimates of unknown variables. In some implementations, the filter can be a Kalman filter.

Based on the map constraints, the motion context, and the attitude information, state space estimator 902 can determine candidate locations of mobile device 106. State space estimator 902 can designate the candidate locations as samples (or "particles") for propagation in particle filter $P(X_k|X_{k-1})$, where $X_k$ are current locations of mobile device 106 at time k, $X_{k-1}$ are previous locations at time k−1. Propagating the particle filter can include applying the available information, including map data, motion context, and attitude information to the particle filter to determine probability density of the candidate locations in at least a portion of the venue, given previous locations. Propagating the particle filter can be based on a stochastic process for exploring some or all potential constraints. In some implementations, the stochastic process can be a discretized Wiener process. Propagating the particle filter can be subject to a multi-dimensional correlation function based on availability of the constraints.

State space estimator 902 can detect particle depletion when a number of candidate locations fall below a threshold number sufficient for probability density calculation. Upon such detection, state space estimator 902 can perform a parallel resampling of a portion of the venue or the entire venue to recover from filter divergence.

Upon propagating the particle filter, state space estimator 902 can provide the particle filter to location estimator 904 for update. Location estimator 904 can update the particle filter using a location observation received from a scan analyzer (e.g., scan analyzer 116 as described in reference to FIG. 4). Updating the particle filter can include feeding estimated fingerprint location into the particle filter. The location observation can be subject to a measurement model having a given system uncertainty. Updating the particle filter can include calculating probability density $P(X_k|X_{k-1}, Z_k)$ where $Z_k$ is a location observation at time k. In this step, the candidate locations are updated according to the new location observation.

Pathway matching can be performed to match candidate locations to segments representing pathways in the venue. As discussed above, for each candidate location sampled by the particle filter, a search is performed to identify the pathway segments that are visible to the candidate location. A segment having the shortest distance to the candidate location is identified. If the distance between the candidate location and the segment is smaller than a threshold (e.g., dq/2 in Equation 1), the candidate location is mapped onto the segment using an orthogonal projection. If the distance between the candidate location and the segment is equal to or greater than the threshold, the candidate location is mapped to an updated candidate location that is closer to, but not on, the segment. A weight value w is calculated according to a probability distribution function. The weight value w is used to determine the amount of shift from the candidate location to toward the segment. Location estimator 904 can then determine a current location of mobile device 106 (location at time k) using the probability density, including designating a most likely location of mobile device 106 as the current location of mobile device 106.

Figure 12:
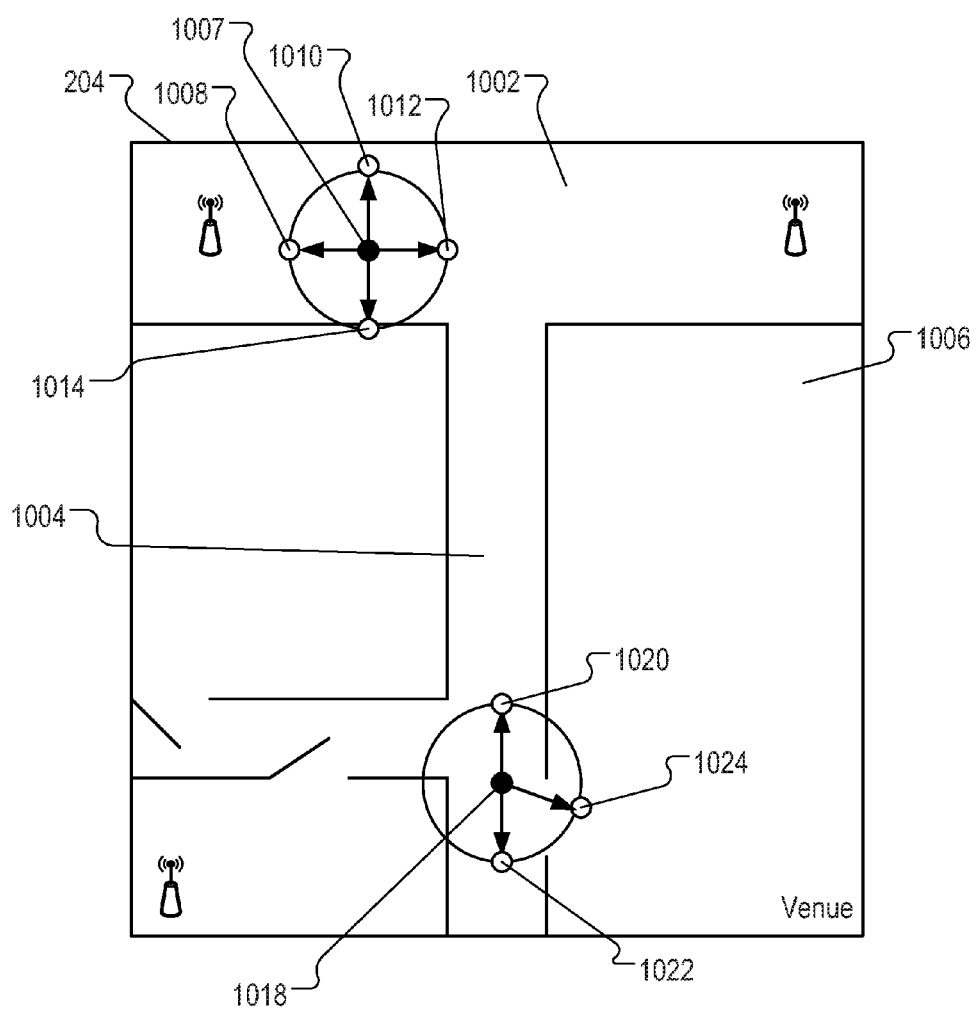
FIG. 12 illustrates exemplary application of constraints to a particle filter.

FIG. 12 illustrates exemplary application of constraints to a particle filter. A state space sampler (e.g., state space estimator 902 as described above in reference to FIG. 11) can receive map data of venue 204. The map data can specify that venue 204 includes open space 1002, hallway 1004, and office 1006.

For a given time k, mobile device 106 can determine initial location 1007 corresponding to time k−1. The initial location can be a previously estimated location of mobile device 106. Immediately after mobile device 106 entered venue 204, or immediately after mobile device 106 is turned on at venue 204, it is possible that mobile device 106 has not performed a previous location estimate. In such cases, mobile device 106 can determine that initial location 1007 is a random location in venue 204. Initial location 1007 is illustrated as a single point. In some implementations, initial location 1007 can be a probability density function on multiple possible locations, each possible location being associated with a probability that mobile device 106 is located at that location. The probability density function can be discrete or continuous.

Mobile device 106 can determine, using one or more sensors, that mobile device 106 is stationary, e.g., when linear and angular speed and linear and angular acceleration are zero or near zero (e.g., undistinguishable from system error margin). Upon determining that mobile device 106 is stationary, mobile device 106 can generate candidate locations 1008, 1010, 1012, and 1014 for time k for a particle filter. Candidate locations 1008, 1010, 1012, and 1014 can be generated based on state space system noise. In addition, initial location 1007 can be a candidate location. Mobile device 106 can apply constraints of movement in venue 204 to the particle filter. For example, mobile device 106 can determine that, since initial location 1007 is in open space 1002, no directional constraint need to be applied; candidate locations 1008, 1010, 1012, and 1014 can be in any direction from initial location 1007. In addition, mobile device 106 can determine that candidate location 1014 represents an impossibility, because mobile device 106 needs to go through a barrier (e.g., a wall) or to travel at a speed exceeding a walking or running speed for a pedestrian to go around hallway 1004 to reach candidate location 1014 from initial location 1007. Mobile device 106 can remove candidate location 1014 from the particle filter based on the impossibility.

At given time t, mobile device 106 can determine initial location 1018 of mobile device 106. Initial location 1018 can correspond to time t−1. Mobile device 106 can determine, using one or more sensors, that mobile device 106 is non-stationary, e.g., when linear or angular speed or acceleration is nonzero. Upon determining that mobile device 106 is non-stationary, mobile device 106 can generate candidate locations for time t for a particle filter. The candidate locations can include location distribution sampled by the particle filter. Mobile device 106 can decide that initial location 1018 is on a path in venue 204 following hallway 1004. Accordingly, mobile device 106 can determine that a direction of movement of mobile device 106 is limited to a direction of the path as defined by hallway 1004. Based on a heading of mobile device 106, mobile device 106 can determine candidate location 1020, which is in front of mobile device 106 according to the heading, and candidate location 1022, which can be behind mobile device 106 according to the heading. Mobile device 106 can determine that candidate location 1020 is a more likely location of mobile device 106 than candidate location 1022 is. In addition, mobile device 106 can determine that initial location 1018 is sufficiently close to an entrance of office 1006 such that a pedestrian, moving at walking speed, can enter office 1006 during the time between t−1 and t. Accordingly, mobile device 106 can place candidate location 1024 in office 1006. Mobile device 106 can assign a distinct weight to each of the candidate locations 1020, 1022, and 1024 for the particle filter.

Figure 13A:
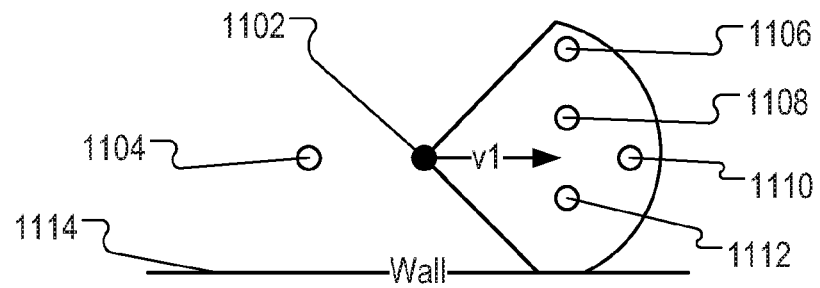
FIGS. 13A-13C illustrate exemplary techniques of configuring a particle filter using readings from sensors of a mobile device.
Figure 13B:
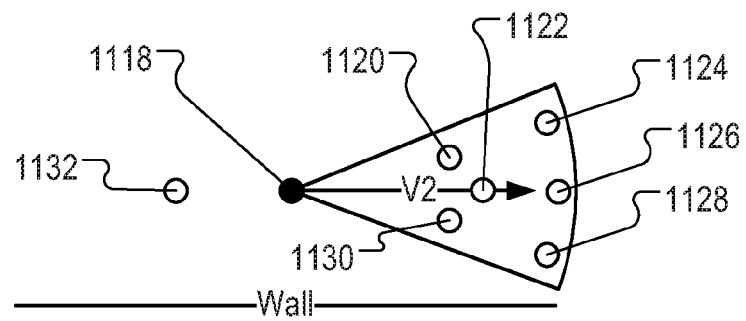
Figure 13C:
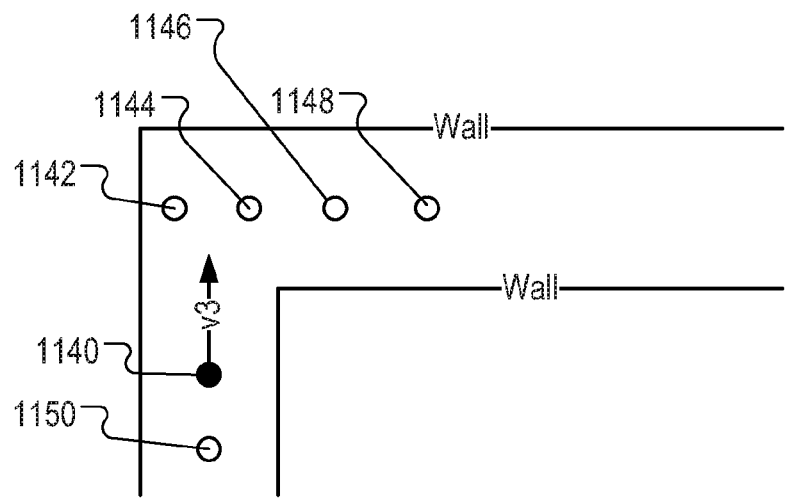

FIGS. 13A-13C illustrate exemplary techniques of configuring a particle filter using readings from sensors of a mobile device. The mobile device can be mobile device 106 as described above in reference to FIG. 4.

FIG. 13A illustrates determining current location estimates based on initial location 1102 when the mobile device is moving at velocity v1. The mobile device can determine the velocity v1 based on rate of change of readings of a sensor. In some implementations, the mobile device can determine the velocity v1 based on a frequency of change of acceleration measured by an accelerometer, where a higher frequency indicates a faster pace of a pedestrian. In addition, the mobile device can determine the velocity v1 based on a magnitude of the acceleration, where a greater magnitude indicates a larger stride.

The mobile device can determine current location estimates 1104, 1106, 1108, 1110, and 1112. The mobile device can generate more current location estimates (e.g., location estimates 1106, 1108, 1110, and 1112) in a direction of the heading of mobile device than current location estimates (e.g., location estimates 1104) in a direction away from the heading. The difference in number of location estimates can simulate situation where the mobile device has a higher likelihood to continue moving in an original heading than to turn back. The current location estimates can be subject to constraints of a venue, e.g., wall 1114. The mobile device can then configure a particle filter using the estimated locations 1104, 1106, 1108, 1110, and 1112, subject to a location observation provided by a scan analyzer (e.g., scan analyzer 116 of FIG. 4). The observation can be derived from location fingerprint data and can include a single location or discrete or continuous probability densities of multiple locations.

FIG. 13B illustrates determining current location estimates based on initial location 1118 when the mobile device is moving at velocity v2. The mobile device can determine that, based on readings of the sensors, velocity v2 is high (e.g., higher than velocity v1 of FIG. 13A). Upon determining that velocity v2 is high, the mobile device can determine that a pedestrian carrying the device is more likely to continue according to the current heading, and less likely to turn back than the pedestrian of FIG. 13A. Accordingly, the mobile device can generate more current location estimates (e.g., location estimates 1120, 1122, 1124, 1126, 1128, and 1130) in a direction of the heading. The mobile device can generate estimated location 1132 in a direction that is away from the heading, to model the possibility that the pedestrian turns back.

The mobile device can generate location estimates 1122 and 1126 on a path the mobile device is projected to be traveling. The mobile device can use location estimates 1122 and 1126 for calculating probabilities the pedestrian is traveling at different velocities, to verify or correct the current velocity (v2) as determined by the motion sensors.

The mobile device can generate location estimates 1120, 1124, 1128 and 1130 for calculating probabilities that the mobile device changes directions. Comparing to FIG. 13A, the velocity v2 is higher than velocity v1. Accordingly, the distribution of location estimates 1120, 1122, 1124, 1126, 1128, and 1130 can be more concentrated along the heading of the mobile device than location estimates 1106, 1108, 1110, and 1112 are, where in a higher concentration, the location estimates are in a narrower beam along the heading and have less divergence away from the heading. For example, in some implementations, an expected number of location estimates is proportional to the velocity of the mobile device; a variance of directions of the location estimate can be inversely proportional to the velocity.

In the examples of FIGS. 13A and 13B, the particle filter can implement a pathway matching step in each iteration to match the location estimates to segments of a path network. Assuming that the mobile device is moving along a pathway near wall 1114. A location estimate can be mapped onto a corresponding segment or shifted toward the segment. Compared to the example in FIG. 13A, the location estimates in the example of FIG. 13B are more concentrated, so on average the amount of shift of the location estimates in FIG. 13B toward the segment will be larger than that of the location estimates in the example of FIG. 13A. This is consistent with the general observation that when a pedestrian is walking faster along a pathway, the pedestrian is more likely to adhere to the pathway and less likely wander off the pathway.

FIG. 13C illustrates determining current location estimates based on initial location 1140 when the mobile device is moving along a pathway. A mobile device can determine initial location 1140 of the mobile device and a motion velocity v3. Based on map data of a venue, the mobile device can determine that the mobile device is heading in a hallway towards a corner. The mobile device can determine that movement of the mobile device is constrained by walls of the hallway. Accordingly, the mobile device can configure a particle filter using location estimates that are on the pathway, e.g., in the hallway. The mobile device can determine current location estimates 1142, 1144, 1146, and 1148 that are not along the heading of the mobile device, but are locations the mobile device is likely to be if the mobile device continues on the heading and then turns to follow the hallway. The mobile device can place more current location estimates (e.g., current location estimates 1142, 1144, 1146, and 1148) in front of the mobile device in the pathway than current location estimates (e.g., current location estimate 1150) behind the mobile device.

During each iteration of the particle filter, pathway matching can be performed so that location estimates 1142, 1144, 1146, 1148, and 1150 are mapped to segments representing the pathways defined by the walls.

Exemplary Processes

Figure 14:
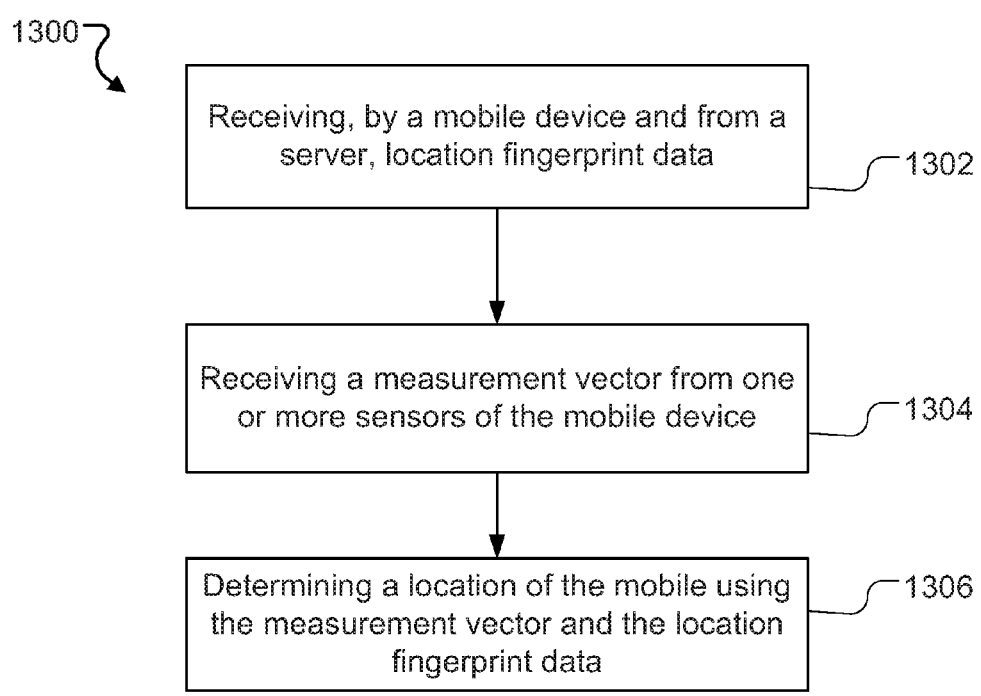
FIG. 14 is a flowchart of an exemplary procedure of estimating a location using location fingerprint data.

FIG. 14 is a flowchart of exemplary procedure 1300 of estimating a location using location fingerprint data. Procedure 1300 can be performed by a mobile device, e.g., mobile device 106 of FIG. 4.

The mobile device can receive (1302), from a server (e.g., location server 102 of FIG. 4), location fingerprint data. The location fingerprint data can include multiple locations at a venue and a fingerprint of each location. The venue can include a space accessible by a pedestrian and one or more constraints of movement of the pedestrian. Each fingerprint can include one or more expected measurements of an environment variable at the corresponding location. Each environment variable can include a signal from a signal source detectable by the mobile device. The one or more signal sources can include at least one of an RF source (e.g., a wireless access point), a light source, a sound source, a magnetic source, or a heat source. The one or more expected measurements can include at least one of an RSSI, a round-trip time, a magnetic field strength, a temperature, a noise level, or an air pressure level.

The mobile device can receive the location fingerprint data by request. The mobile device can request the location fingerprint data from the server when the mobile device determines that the mobile device is located in proximity to the venue based on a threshold. For example, the mobile device can determine, based on GPS signals and a map stored on the mobile device, that the mobile device is located within a threshold distance to a building. The mobile device can then request location fingerprint data of the building from the server. The mobile device can receive the location fingerprint data in response.

The mobile device can receive (1304) a measurement vector from one or more sensors of the mobile device. The measurement vector can include one or more readings of the one or more sensors on the environment variable.

The mobile device can determine (1306) a location of the mobile device at the venue using the measurement vector and the location fingerprint data. Determining the location can include performing a statistical classification categorizing the measurement vector into one or more possible locations where the measurement vector can be received by the one or more sensors. Each possible location can be associated with a likelihood that the measurement vector matching a fingerprint of the respective possible location. Performing the statistical classification can include categorizing, based on training data, a sample vector to one or more categories each being associated with a probability that the sample vector belongs to the corresponding category. The mobile device can designate the location fingerprint data as the training data. The mobile device can designate the measurement vector as the sample vector. The one or more categories each can correspond to a possible location of the mobile device at the venue. The probability associated with each category can indicate a likelihood that the mobile device is located at the possible location corresponding to the category.

The mobile device can determine the probability associated with each category. Determining the probability can include determining a point-wise kernel estimation of a probability density of the measurement vector measured at each of the possible locations. The point-wise kernel estimation can have a kernel function. The mobile device can apply the kernel function to a difference between the measurement vector and a fingerprint of the respective possible location. The kernel function can be a symmetric function that integrates to one (e.g., a Gaussian function).

In some implementations, the mobile device can apply the kernel function to an a priori domain provided by a particle filter. The a priori domain can be a portion of search space represented in the location fingerprint data selected before the probability densities are calculated. The a priori domain can be provided by a particle filter. For example, the a priori domain can be an a posteriori state estimate from the particle filter.

In some implementations, determining the location of the mobile device comprises aggregating statistics of a group of possible locations. In some implementations, determining the location of the mobile device can include calculating the location using the group of locations based on a context. The context can be a motion context. The context can include one or more readings of at least one of an accelerometer, a magnetic sensor, a gyroscope, or a barometer.

Figure 15:
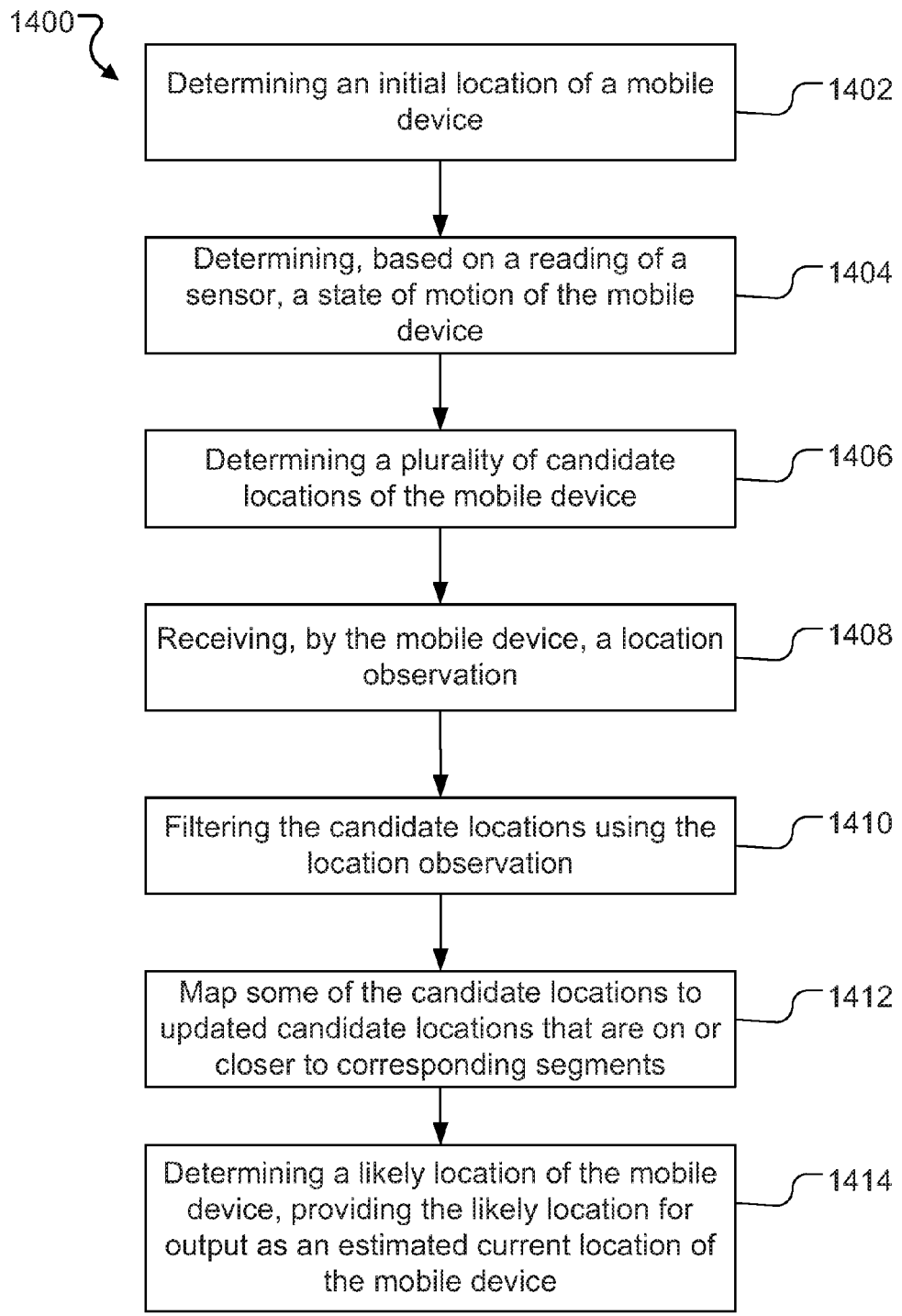
FIG. 15 is a flowchart of an exemplary procedure of estimating a location using a particle filter.

FIG. 15 is a flowchart of exemplary procedure 1400 of estimating a location using a particle filter. Exemplary procedure 1400 can be performed by a mobile device, e.g., mobile device 106 of FIG. 4.

The mobile device can determine (1402) an initial location of the mobile device. The initial location can be at a venue (e.g., inside of a building). The venue can include a space accessible by a pedestrian and one or more constraints of movement of the pedestrian. The initial location can be an a priori location estimate being associated with a given uncertainty value. In some implementations, determining the initial location can include estimating the initial location based on a prior location observation using scan analyzer 116 of FIG. 4. In some implementations, when an initial observation is unavailable, the initial location can be a random location at or near the venue having an initial uncertainty value (e.g., plus or minus 1000 meters), or a last known location determined by GPS signals having an initial uncertainty value (e.g., a value calculated based on time of the last GPS location determination and current time). When the mobile device has no prior location knowledge (e.g., when a new device is turned on for the first time inside of a building), the mobile device can determine that the initial location is a random location, and the uncertainty value is infinity.

The mobile device can determine (1404), based on a reading of a sensor of the mobile device, a state of motion of the mobile device. Determining the state of motion can include determining at least one of a speed or a heading of the mobile device, or rate of change of the speed or heading of the mobile device. The speed, heading, and rate of change of the speed or heading can be determined based on a reading of at least one of an accelerometer, a magnetometer, a barometer, or a gyroscope of the mobile device.

The mobile device can determine (1406) multiple candidate location of the mobile device based at least in part on the initial location, the state of motion, and a map of the venue specifying the one or more constraints. Determining the candidate locations can include determining whether the mobile device is stationary. If the mobile device is stationary, the mobile device can generate the candidate locations based on a state space system noise model, e.g., by generating the candidate locations randomly around the initial location. If the mobile device moves, the mobile device can determine a likelihood that the mobile device is moving from the initial location in a direction that avoids the constraints. The mobile device can then generate the candidate locations. The mobile device can generate more candidate locations in a direction that is associated with a higher likelihood (e.g., a direction that is along a heading of the mobile device).

In some implementations, determining the likelihood that the mobile device is moving from the initial location in the direction that avoids the constraints can include determining a path (e.g., hallway) of the venue based on the constraints. The mobile device can determine a destination type of a point on the path based on the map. The destination type (e.g., office, cafeteria, or lobby) can be indicative of a likelihood that the pedestrian will move toward a destination of the path when the pedestrian is moving along the path. The point can be located at an end of the path or on the path. The mobile device can determine the likelihood that the mobile device is moving from the initial location in the direction based on the destination type of the path. For example, if the destination type of a point in the middle of the path is a cafeteria, lobby, or conference room, the mobile device can determine that a pedestrian is more likely to enter the cafeteria or lobby than if the destination type of the point is an office.

The mobile device can determine whether the candidate locations are depleted. The mobile device can determine that a count of the one or more candidate locations satisfies a depletion threshold. Upon such determination, the mobile device can generate a candidate location at a random location in the venue for location determination.

The mobile device can receive (1408) a location observation. The location observation can include an estimated location of the mobile device in the space of the venue. The estimated location can be determined based on readings of one or more sensors of the mobile device and location fingerprint data describing attributes of signals measurable by the one or more sensors when the mobile device is at the venue.

The mobile device can filter (1410) the candidate locations using the location observation, including determining a likely location of the mobile device based on the candidate locations, the observation, and a probability model.

The mobile device can map (1412) some of the candidate locations to updated candidate locations that are on or closer to corresponding segments.

The mobile device can determine (1414) the likely location of the mobile device, including determining a probability density based on the updated candidate locations. The mobile device can provide the likely location for output as a current location of the mobile device. The mobile device can designate the current location as an initial location for estimating a next current location of the mobile device. Providing the likely location for output can include displaying the likely location as a pin on a map of the venue displayed on a screen of the mobile device.

Figure 16:
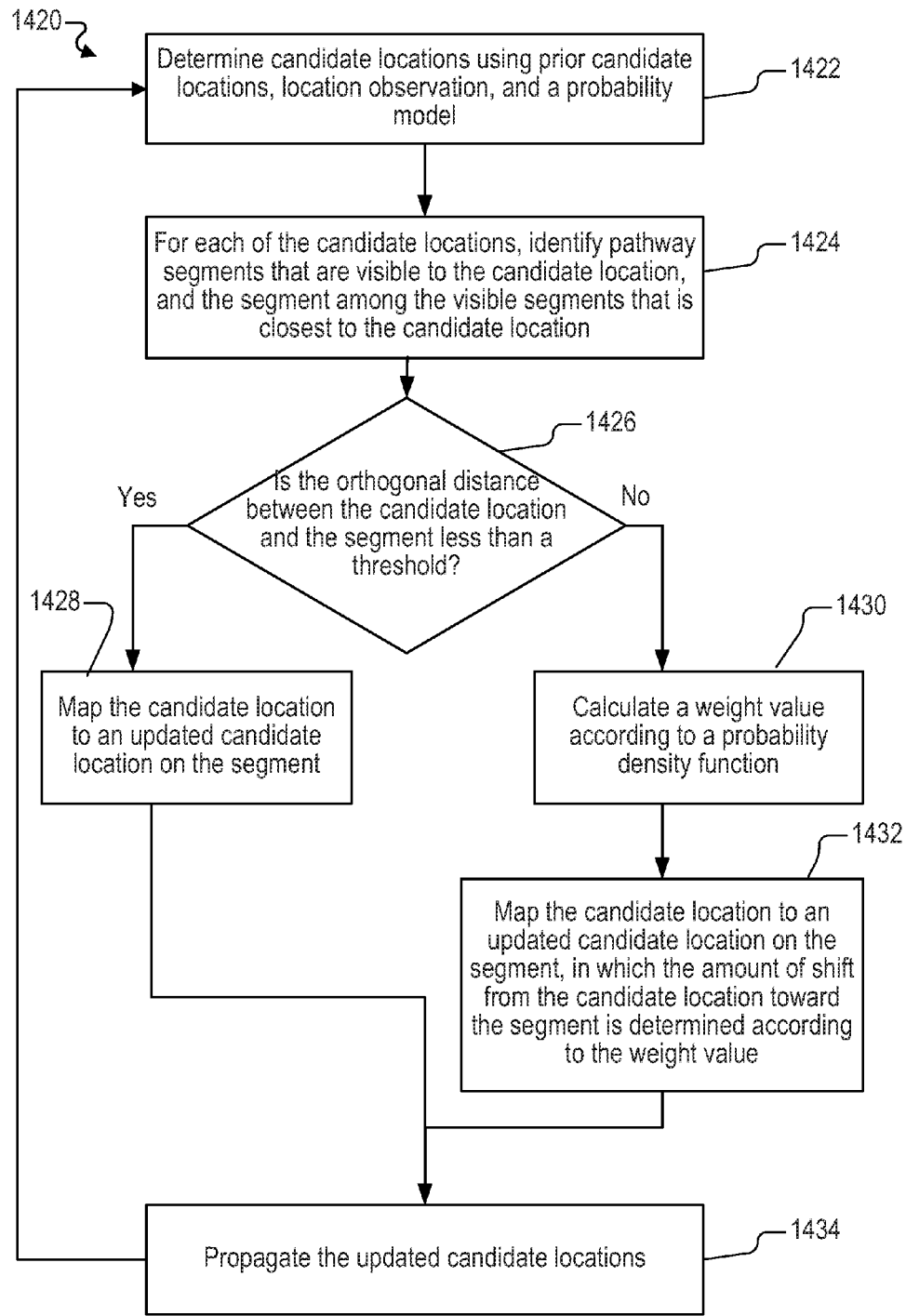
FIG. 16 is a flowchart of exemplary procedure of pathway matching by a state space model.

FIG. 16 is a flowchart of exemplary procedure 1420 of pathway matching by a state space model, such as a particle filter. Exemplary procedure 1420 can be performed by a mobile device, e.g., mobile device 106 of FIG. 4.

The mobile device can determine (1422) candidate locations using prior candidate locations, location observation, and a probability model.

The mobile device can identify (1424), for each of the candidate locations, pathway segments that are visible to the candidate location, and the segment among the visible segments that is closest to the candidate location.

The mobile device can determine (1426), if the orthogonal distance between the candidate location and the segment is less than a threshold.

If the orthogonal distance between the candidate location and the segment is less than the threshold, the candidate location is mapped (1428) to an updated candidate location on the segment.

If the orthogonal distance between the candidate location and the segment is equal to or larger than the threshold, the mobile device can calculate (1430) a weight value calculated according to a probability density function. The candidate location is mapped (1432) to an updated candidate location that is closer to, but not on, the segment. The amount of shift from the candidate location toward the segment is determined according to the weight value.

The mobile device can propagate (1434) the updated candidate locations. The updated locations are used as prior art candidate locations for determining current candidate locations in a next iteration.

Figure 17:
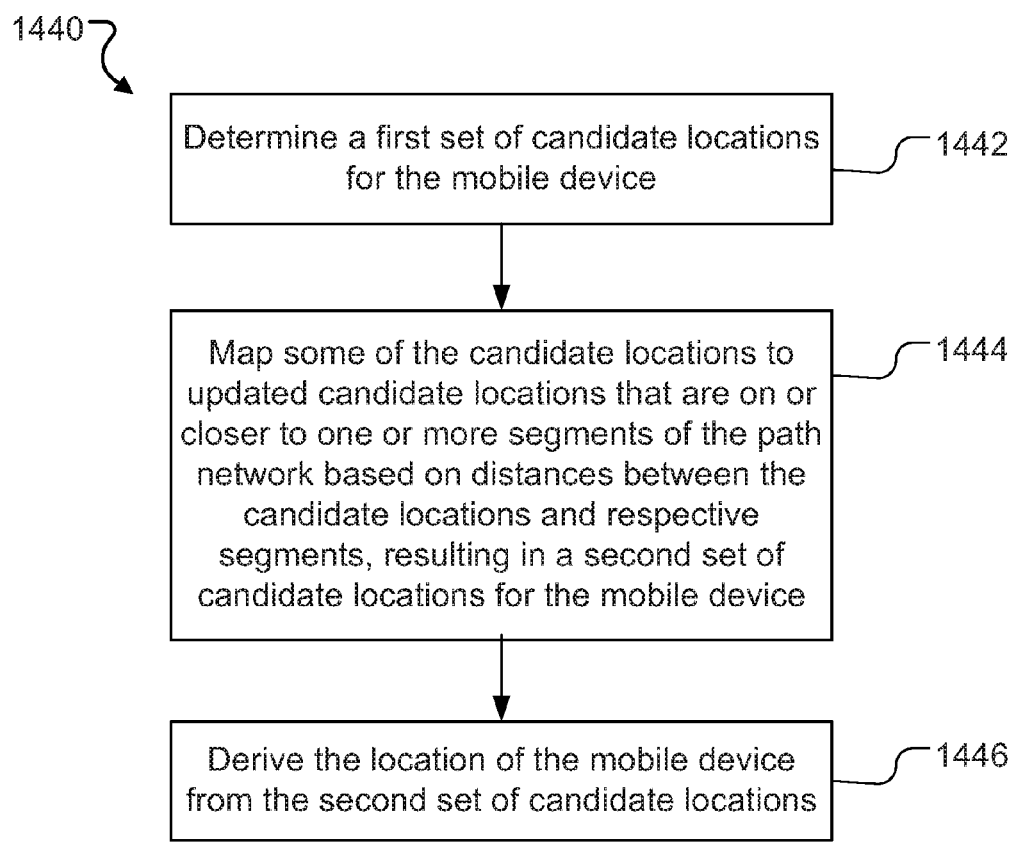
FIGS. 17 and 18 are flowcharts of exemplary procedures for estimating a location of a mobile device in a venue having pathways.

FIG. 17 is a flowchart of exemplary procedure 1440 for estimating a location of a mobile device in a venue having pathways represented by a path network that includes segments connected by junctions. Exemplary procedure 1440 can be performed by a mobile device, e.g., mobile device 106 of FIG. 4.

The procedure 1440 includes determining (1442) a first set of candidate locations for the mobile device.

Some of the candidate locations are mapped (1444) to updated candidate locations that are on or closer to one or more segments of the path network based on distances between the candidate locations and respective segments, resulting in a second set of candidate locations for the mobile device.

The location of the mobile device is derived (1446) from the second set of candidate locations.

Figure 18:
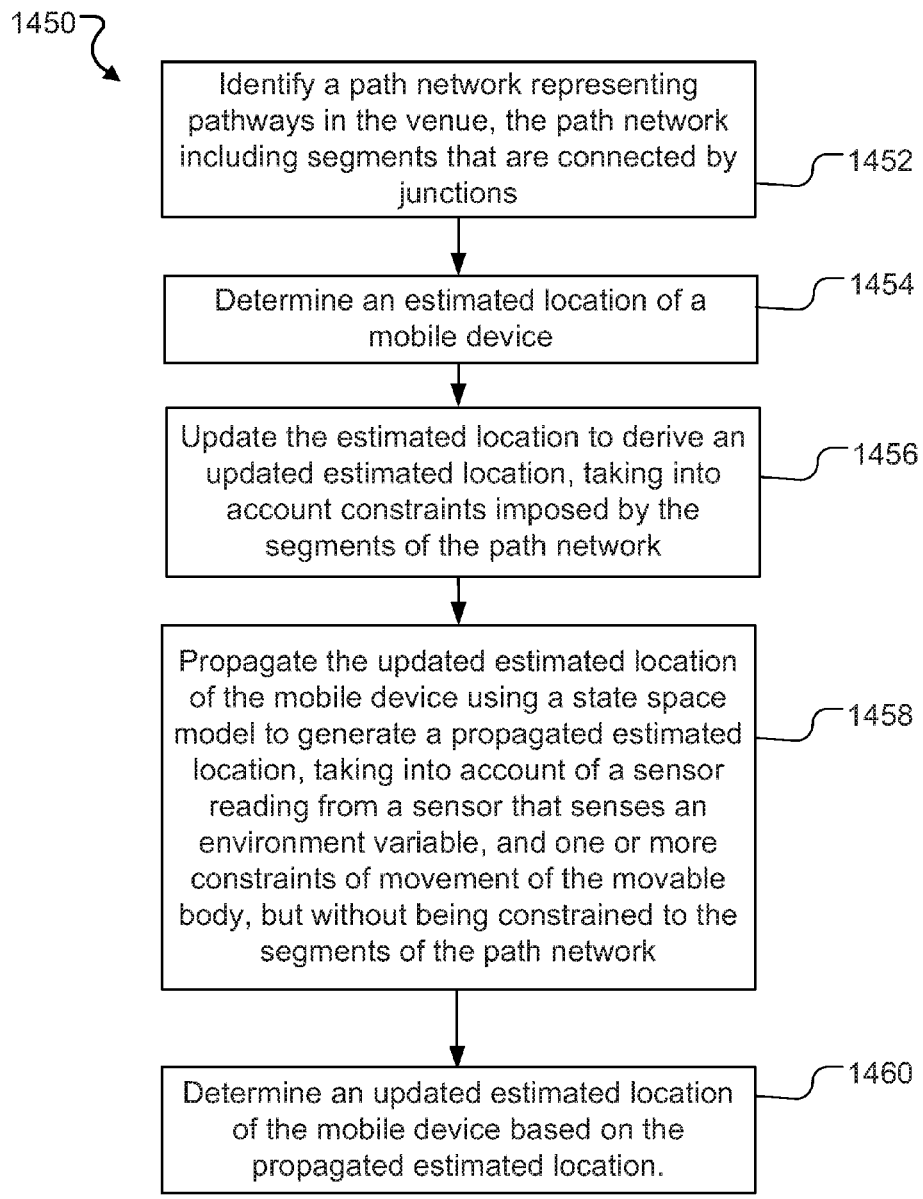

FIG. 18 is a flowchart of exemplary procedure 1450 for estimating a location of a mobile device in a venue including a space accessible by a movable body carrying a mobile device and one or more constraints of movement of the movable body. Exemplary procedure 1450 can be performed by a mobile device, e.g., mobile device 106 of FIG. 4.

The exemplary procedure 1450 can include identifying (1452) a path network representing pathways in the venue, the path network including segments that are connected by junctions.

An estimated location of a mobile device is determined (1454).

The estimated location is updated (1456) to derive an updated estimated location, taking into account constraints imposed by the segments of the path network.

The updated estimated location of the mobile device is propagated (1458) using a state space model to generate a propagated estimated location, taking into account of a sensor reading from a sensor that senses an environment variable, and one or more constraints of movement of the movable body, but without being constrained to the segments of the path network.

An updated estimated location of the mobile device is determined (1460) based on the propagated estimated location.

Exemplary System Architecture

Figure 19:
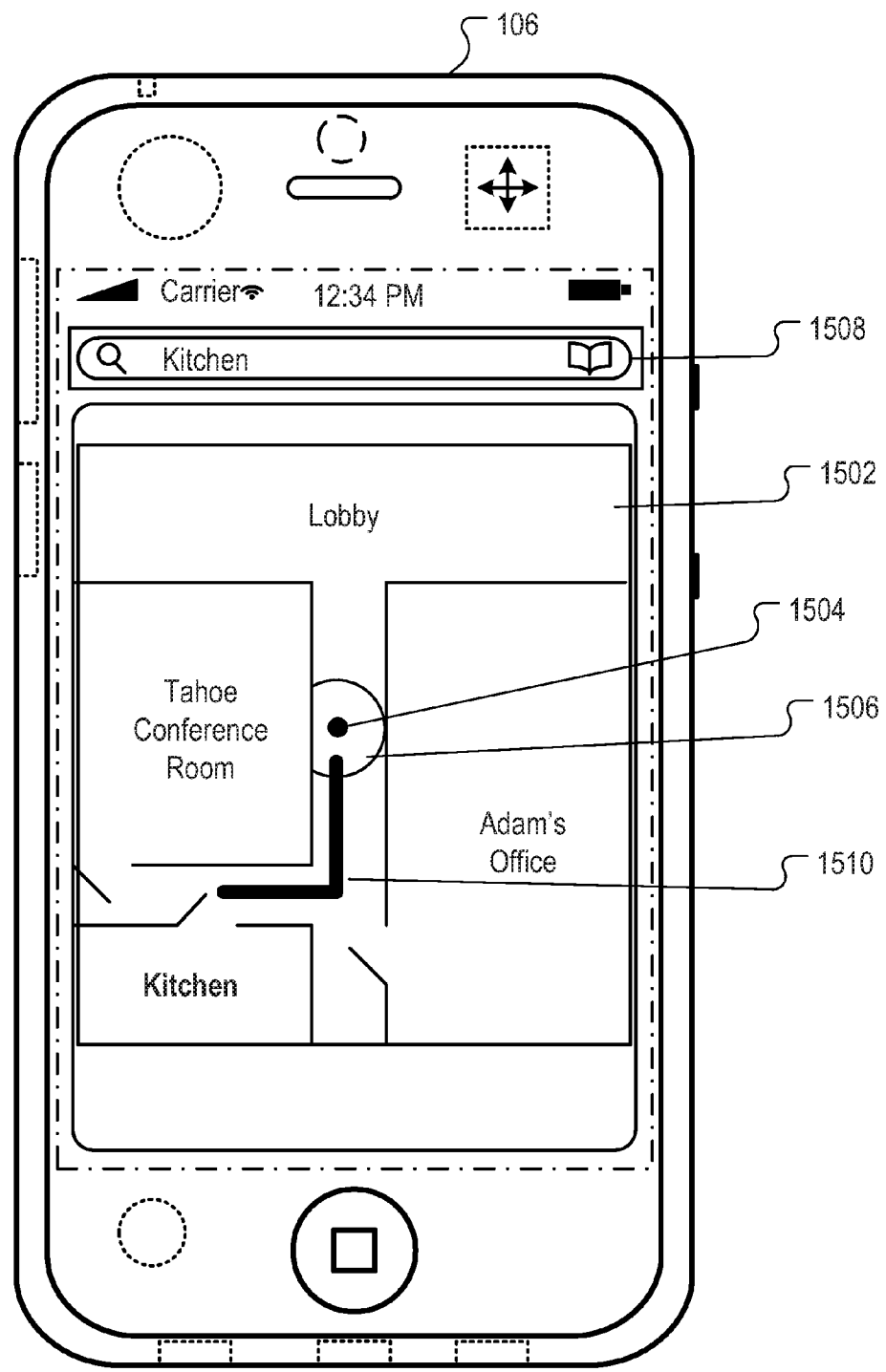
FIG. 19 is an exemplary user interface for displaying a location of a mobile device at a venue.

FIG. 19 is an exemplary user interface for displaying a location of a mobile device at a venue. The mobile device can be mobile device 106 as described in reference to FIG. 4.

The user interface can include map 1502 of a venue, e.g., a building. Map 1502 can include walls, spaces, rooms, and room designations of a particular floor. The mobile device can estimate a current location of the mobile device, and provide the current location for display as location marker 1504 in map 1502 on a display device of the mobile device. The mobile device can determine which floor is displayed based on an altitude aspect of the estimate of a current location of the mobile device. The estimated location can include an uncertainty region. The uncertainty region can include a region around the estimated current location where probability density of the mobile device is located in locations in the region that exceeds a threshold. The uncertainty region can be displayed as uncertainty region area 1506 around location marker 1504. Uncertainty region and uncertainty region area 1506 need not be a perfectly circular area, given locations rendered impossible by movement constraints in venue 204 and motion speed of a pedestrian.

The user interface can include search box 1508. Search box 1508 can be configured to receive input for a search term. Upon receiving the search term through search box 1508, the mobile device can search data associated with map 1502 and determine if the search term matches a portion of the venue. The mobile device can emphasize or otherwise mark the portion if a match is found. For example, when the mobile device receives a search term "kitchen" and a portion of the venue is designated as "kitchen," the mobile device can highlight the kitchen portion on map 1502. In some implementations, the mobile device can designate the found portion (e.g., "kitchen") as a destination. The mobile device can determine path 1510 that leads from the current location to the destination, and display path 1510 on map 1502.

Exemplary System Architecture

Figure 20:
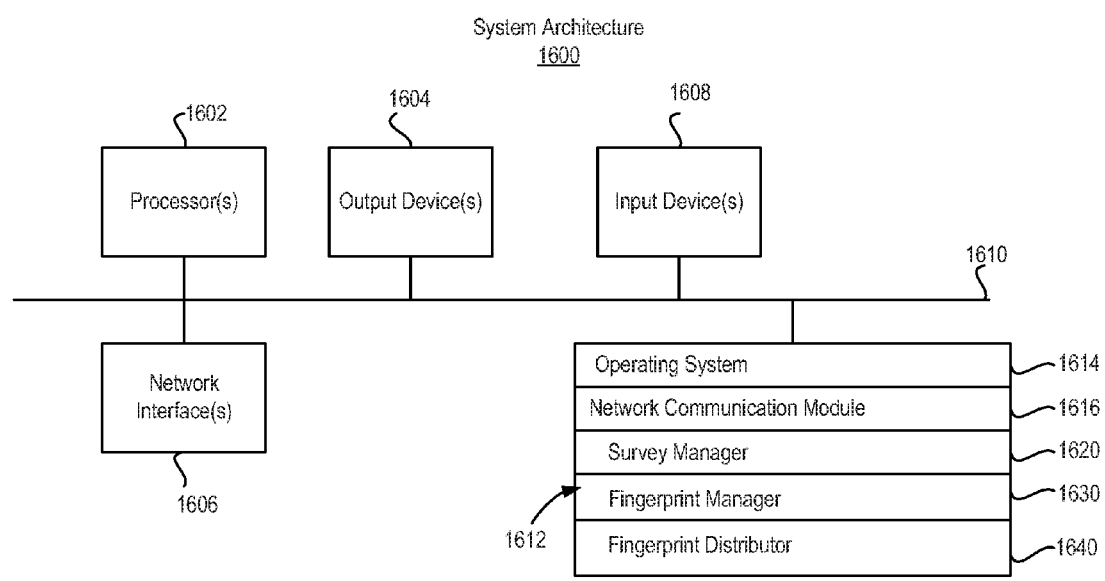
FIG. 20 is a block diagram of an exemplary system architecture for implementing the features and operations of FIGS. 1-19.

FIG. 20 is a block diagram of an exemplary system architecture for implementing the features and operations of FIGS. 1-19. Other architectures are possible, including architectures with more or fewer components. In some implementations, architecture 1600 includes one or more processors 1602 (e.g., dual-core Intel® Xeon® Processors), one or more output devices 1604 (e.g., LCD), one or more network interfaces 1606, one or more input devices 1608 (e.g., mouse, keyboard, touch-sensitive display) and one or more computer-readable mediums 1612 (e.g., RAM, ROM, SDRAM, hard disk, optical disk, flash memory, etc.). These components can exchange communications and data over one or more communication channels 1610 (e.g., buses), which can utilize various hardware and software for facilitating the transfer of data and control signals between components.

The term "computer-readable medium" refers to a medium that participates in providing instructions to processor 1602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1612 can further include operating system 1614 (e.g., a Linux® operating system), network communication module 1616, survey manager 1620, fingerprint manager 1630, and fingerprint distributor 1640. Operating system 1614 can be multi-user, multiprocessing, multitasking, multithreading, real time, etc. Operating system 1614 performs basic tasks, including but not limited to: recognizing input from and providing output to devices 1606, 1608; keeping track and managing files and directories on computer-readable mediums 1612 (e.g., memory or a storage device); controlling peripheral devices; and managing traffic on the one or more communication channels 1610. Network communications module 1616 includes various components for establishing and maintaining network connections (e.g., software for implementing communication protocols, such as TCP/IP, HTTP, etc.).

Survey manager 1620 can include computer instructions that, when executed, cause processor 1602 to provide survey instructions and maps to a sampling device and receive survey data from the sampling device. Fingerprint manager 1630 can include computer instructions that, when executed, cause processor 1602 to perform operations of signal estimator 110 and fingerprint engine 108 as described above in reference to FIG. 4. Fingerprint distributor 1640 can include computer instructions that, when executed, cause processor 1602 to respond to a fingerprint request from a mobile device (e.g., mobile device 106 of FIG. 4), including sending location fingerprint data to the requesting mobile device.

Architecture 1600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Exemplary Mobile Device Architecture

Figure 21:
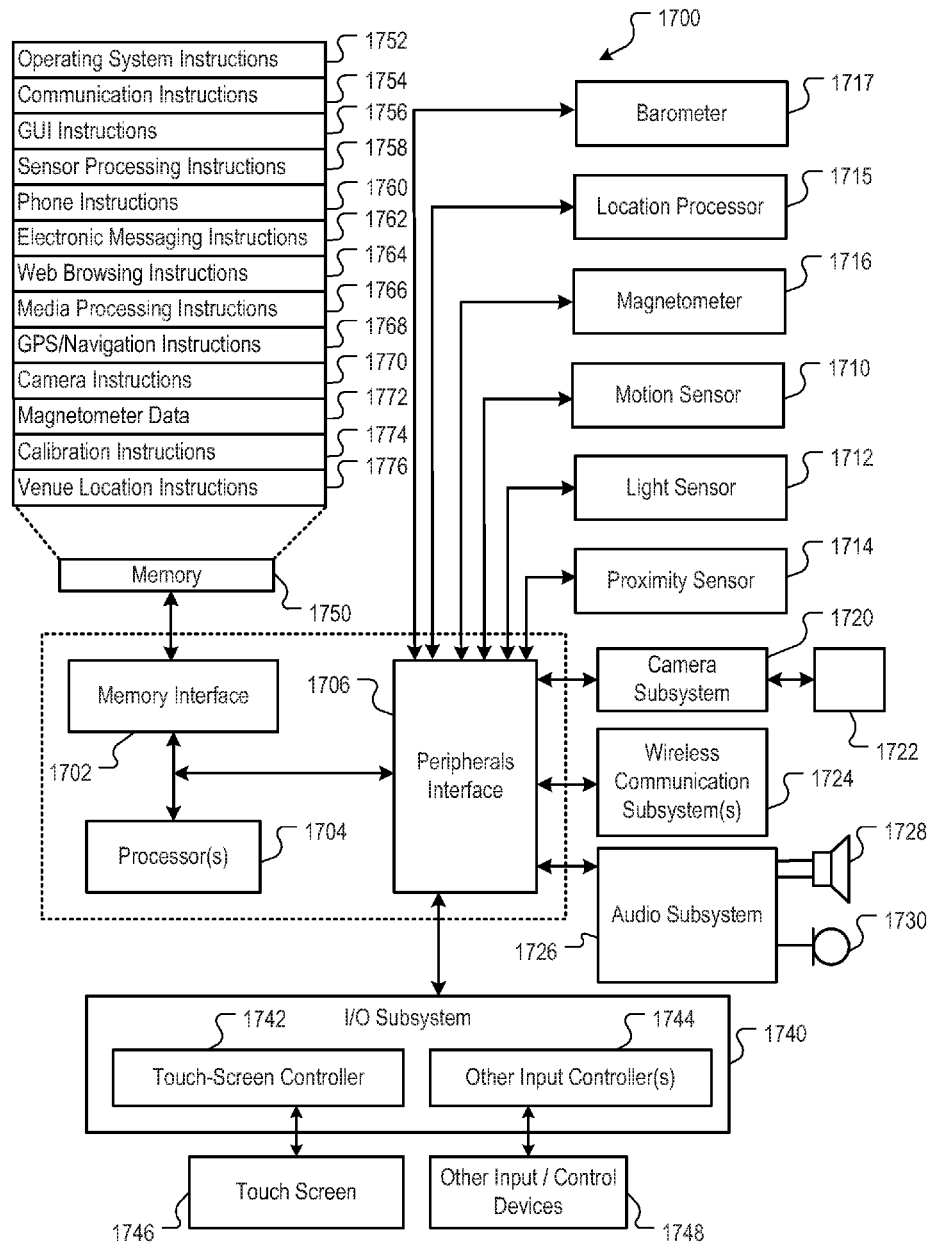
FIG. 21 is a block diagram illustrating an exemplary device architecture of a mobile device implementing the features and operations described in reference to FIGS. 1-19.

FIG. 21 is a block diagram of an exemplary architecture 1700 for the mobile devices of FIGS. 1-19. A mobile device (e.g., mobile device 106) can include memory interface 1702, one or more data processors, image processors and/or processors 1704, and peripherals interface 1706. Memory interface 1702, one or more processors 1704 and/or peripherals interface 1706 can be separate components or can be integrated in one or more integrated circuits. Processors 1704 can include application processors, baseband processors, and wireless processors. The various components in mobile device 106, for example, can be coupled by one or more communication buses or signal lines.

Sensors, devices, and subsystems can be coupled to peripherals interface 1706 to facilitate multiple functionalities. For example, motion sensor 1710, light sensor 1712, and proximity sensor 1714 can be coupled to peripherals interface 1706 to facilitate orientation, lighting, and proximity functions of the mobile device. Location processor 1715 (e.g., GPS receiver) can be connected to peripherals interface 1706 to provide geopositioning. Electronic magnetometer 1716 (e.g., an integrated circuit chip) can also be connected to peripherals interface 1706 to provide data that can be used to determine the direction of magnetic North. Thus, electronic magnetometer 1716 can be used as an electronic compass. Motion sensor 1710 can include one or more accelerometers configured to determine change of speed and direction of movement of the mobile device. Barometer 1717 can include one or more devices connected to peripherals interface 1706 and configured to measure pressure of atmosphere around the mobile device.

Camera subsystem 1720 and an optical sensor 1722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1724, which can include radio frequency receivers and transmitters and/or optical (e.g., infrared) receivers and transmitters. The specific design and implementation of the communication subsystem 1724 can depend on the communication network(s) over which a mobile device is intended to operate. For example, a mobile device can include communication subsystems 1724 designed to operate over a GSM network, a GPRS network, an EDGE network, a Wi-Fi™ or WiMax™ network, and a Bluetooth™ network. In particular, the wireless communication subsystems 1724 can include hosting protocols such that the mobile device can be configured as a base station for other wireless devices.

Audio subsystem 1726 can be coupled to a speaker 1728 and a microphone 1730 to facilitate voice-enabled functions, such as voice recognition, voice replication, digital recording, and telephony functions. Audio subsystem 1726 can be configured to receive voice commands from the user.

I/O subsystem 1740 can include touch screen controller 1742 and/or other input controller(s) 1744. Touch-screen controller 1742 can be coupled to a touch screen 1746 or pad. Touch screen 1746 and touch screen controller 1742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1746.

Other input controller(s) 1744 can be coupled to other input/control devices 1748, such as one or more buttons, rocker switches, thumb-wheel, infrared port, USB port, and/or a pointer device such as a stylus. The one or more buttons (not shown) can include an up/down button for volume control of speaker 1728 and/or microphone 1730.

In one implementation, a pressing of the button for a first duration may disengage a lock of the touch screen 1746; and a pressing of the button for a second duration that is longer than the first duration may turn power to mobile device 106 on or off. The user may be able to customize a functionality of one or more of the buttons. The touch screen 1746 can, for example, also be used to implement virtual or soft buttons and/or a keyboard.

In some implementations, mobile device 106 can present recorded audio and/or video files, such as MP3, AAC, and MPEG files. In some implementations, mobile device 106 can include the functionality of an MP3 player. Mobile device 106 may, therefore, include a pin connector that is compatible with the iPod. Other input/output and control devices can also be used.

Memory interface 1702 can be coupled to memory 1750. Memory 1750 can include high-speed random access memory and/or non-volatile memory, such as one or more magnetic disk storage devices, one or more optical storage devices, and/or flash memory (e.g., NAND, NOR). Memory 1750 can store operating system 1752, such as Darwin, RTXC, LINUX, UNIX, OS X, WINDOWS, or an embedded operating system such as VxWorks. Operating system 1752 may include instructions for handling basic system services and for performing hardware dependent tasks. In some implementations, operating system 1752 can include a kernel (e.g., UNIX kernel).

Memory 1750 may also store communication instructions 1754 to facilitate communicating with one or more additional devices, one or more computers and/or one or more servers. Memory 1750 may include graphical user interface instructions 1756 to facilitate graphic user interface processing; sensor processing instructions 1758 to facilitate sensor-related processing and functions; phone instructions 1760 to facilitate phone-related processes and functions; electronic messaging instructions 1762 to facilitate electronic-messaging related processes and functions; web browsing instructions 1764 to facilitate web browsing-related processes and functions; media processing instructions 1766 to facilitate media processing-related processes and functions; GPS/Navigation instructions 1768 to facilitate GPS and navigation-related processes and instructions; camera instructions 1770 to facilitate camera-related processes and functions; magnetometer data 1772 and calibration instructions 1774 to facilitate magnetometer calibration. The memory 1750 may also store other software instructions (not shown), such as security instructions, web video instructions to facilitate web video-related processes and functions, and/or web shopping instructions to facilitate web shopping-related processes and functions. In some implementations, the media processing instructions 1766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1750. Memory 1750 can include venue location instructions 1776 that can be used to request location fingerprint data and determine a location of the mobile device when the mobile device is at a venue, e.g., inside of a building where GPS signals are unavailable.

Each of the above identified instructions and applications can correspond to a set of instructions for performing one or more functions described above. These instructions need not be implemented as separate software programs, procedures, or modules. Memory 1750 can include additional instructions or fewer instructions. Furthermore, various functions of the mobile device may be implemented in hardware and/or in software, including in one or more signal processing and/or application specific integrated circuits.

Exemplary Operating Environment

Figure 22:
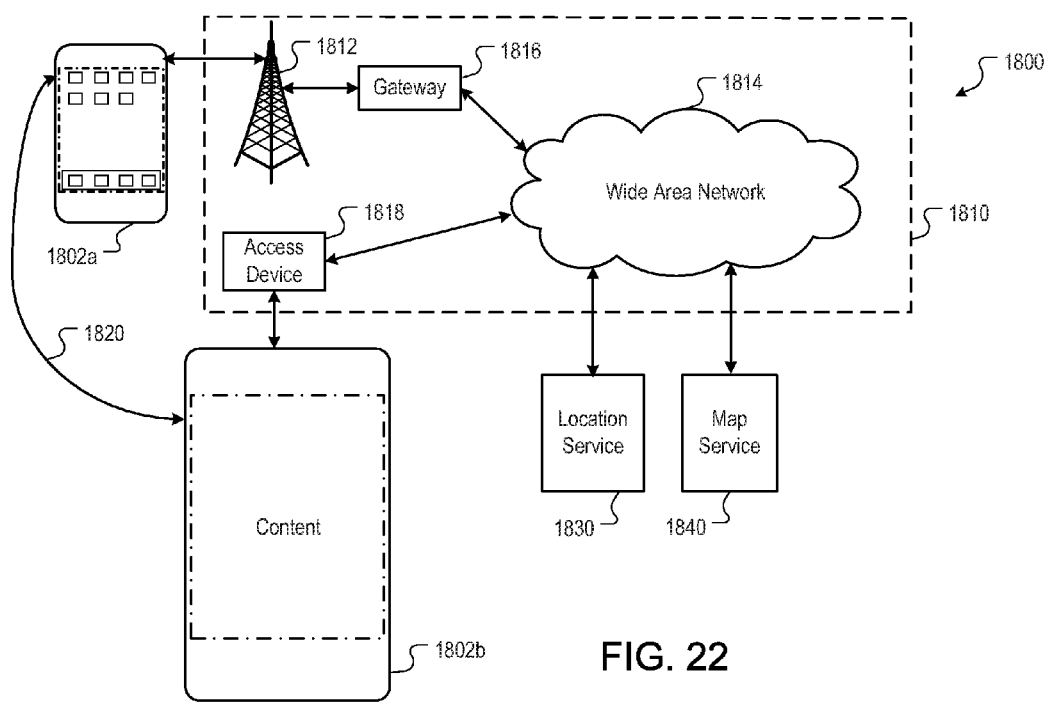
FIG. 22 is a block diagram of an exemplary network operating environment for the mobile devices of FIGS. 1-19.

FIG. 22 is a block diagram of an exemplary network operating environment 1800 for the mobile devices of FIGS. 1-19. Mobile devices 1802a and 1802b can, for example, communicate over one or more wired and/or wireless networks 1810 in data communication. For example, a wireless network 1812, e.g., a cellular network, can communicate with a wide area network (WAN) 1814, such as the Internet, by use of a gateway 1816. Likewise, an access device 1818, such as an 802.11g wireless access point, can provide communication access to the wide area network 1814.

In some implementations, both voice and data communications can be established over wireless network 1812 and the access device 1818. For example, mobile device 1802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1812, gateway 1816, and wide area network 1814 (e.g., using Transmission Control Protocol/Internet Protocol (TCP/IP) or User Datagram Protocol (UDP)). Likewise, in some implementations, the mobile device 1802b can place and receive phone calls, send and receive e-mail messages, and retrieve electronic documents over the access device 1818 and the wide area network 1814. In some implementations, mobile device 1802a or 1802b can be physically connected to the access device 1818 using one or more cables and the access device 1818 can be a personal computer. In this configuration, mobile device 1802a or 1802b can be referred to as a "tethered" device.

Mobile devices 1802a and 1802b can also establish communications by other means. For example, wireless device 1802a can communicate with other wireless devices, e.g., other mobile devices, cell phones, etc., over the wireless network 1812. Likewise, mobile devices 1802a and 1802b can establish peer-to-peer communications 1820, e.g., a personal area network, by use of one or more communication subsystems, such as the Bluetooth™ communication devices. Other communication protocols and topologies can also be implemented.

The mobile device 1802a or 1802b can, for example, communicate with one or more services 1830 and 1840 over the one or more wired and/or wireless networks. For example, one or more location services 1830 can conduct surveys of venues, generate location fingerprint data for each venue, and provide the location fingerprint data to mobile device 1802a or 1802b. Map service 1840 can, for example, provide maps of venues, e.g., maps of structures of buildings to mobile device 1802a or 1802b.

Mobile device 1802a or 1802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1802a or 1802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, the probability density function can be different from the function represented by equation 1. The threshold can be different from those described above. The particle filter engine 118 (FIG. 4) can be replaced with other types of location estimators that use state space models. The sensors 114 can sense environment variables other than those described above. The probability distribution function associated with a segment may change over time. For example, different values for the stretching parameter dq and standard deviation δ may be assigned to a segment for different times of the day, representing different foot traffic patterns for different times of the day. The foot traffic pattern in a transportation hub (e.g., train station or airport) may be different for morning and evening rush hours, and may be different for weekdays and weekends. For example, during weekdays, pedestrians may be more focused on traveling to specific locations and therefore adhere to pathways more closely. On weekends, the pedestrians may walk more leisurely and wander around more. The topology of a path network may change according to day and time. The direction of movement on the pathways may also change according to day and time.

Performing pathway matching to improve location estimates is not limited to mobile devices that can be carried by a pedestrian. Other types of machines can also perform pathway matching in order to use pathway information in improving accuracy of location estimates. For example, a robot may perform pathway matching to aid location estimation as it moves around a venue having pathways.

What is claimed is:

1. A computer-implemented method, comprising:
   estimating a location of a mobile device relative to pathways represented by a path network that includes segments connected by junctions, the estimating including
   determining a first set of candidate locations for the mobile device,
   shifting one or more of the candidate locations to updated candidate locations that are closer to, but not on, a corresponding segment or segments of the network path when the distances between the candidate locations and the corresponding segment or segments are larger than a threshold, wherein the shifting of the one or more candidate locations results in a second set of candidate locations for the mobile device, and
   deriving the location of the mobile device from the second set of candidate locations.

2. The method of claim 1, comprising
   receiving a sensor reading from a sensor that senses an environment variable,
   propagating the second set of candidate locations based on the sensor reading, resulting in a third set of candidate locations, in which the third set of candidate locations is not constrained to the path network for at least a portion of the path network, and
   estimating the location of the mobile device based on the third set of candidate locations.

3. The method of claim 2, wherein the propagating of the second set of candidate locations comprises using a state space estimator to explore possible candidate locations at a next time point given the second set of candidate locations at a previous time point.

4. The method of claim 3, wherein the state space estimator takes into account directions of the segments when exploring the possible candidate locations at the next time point.

5. The method of claim 2, wherein when propagating the second set of candidate locations to derive the third set of candidate locations, the third set of candidate locations is constrained to the path network for at least a portion of the path network.

6. The method of claim 1, wherein the shifting comprises shifting one or more of the candidate locations to updated locations that are on the corresponding segment or segments when the distances between the candidate locations and the corresponding segment or segments are less than a threshold.

7. The method of claim 6, wherein the shifting one or more of the candidate locations to updated candidate locations comprises for each of the one or more of the candidate locations, identifying a segment having an orthogonal distance from the candidate location that is smallest among the segments in the path network, and shifting the candidate location to the corresponding updated candidate location that is on or closer to the segment.

8. The method of claim 1, wherein the pathways represent routes that may be traveled by a pedestrian carrying the mobile device.

9. The method of claim 1, comprising determining that no constraint of movement of the mobile device is located between the candidate locations and the corresponding segment or segments prior to shifting the candidate locations to the updated candidate locations.

10. A computer-implemented method, comprising:
    estimating a location of a mobile device relative to pathways represented by a path network that includes segments connected by junctions, the estimating including
    determining a first set of candidate locations for the mobile device,
    shifting one or more of the candidate locations to updated candidate locations that are on or closer to one or more segments of the path network based on distances between the candidate locations and respective segments, wherein the shifting
    comprises determining a weight value based on a probability distribution function and a distance between a candidate location from the first set of candidate locations and a corresponding segment, and determining a position of the updated candidate location based on the weight value, and
    results in a second set of candidate locations for the mobile device, and
    deriving the location of the mobile device from the second set of candidate locations.

11. The method of claim 10, wherein when a segment represents a path in a hallway, the probability distribution function associated with the segment is dependent on a width of the hallway.

12. The method of claim 10, wherein the probability distribution function associated with the segment is dependent on a density of pathways in a vicinity of the segment.

13. The method of claim 10, comprising determining whether there is any constraint of movement of the movable body between the one or more candidate locations and a corresponding segment, and shifting the one or more candidate locations to the updated candidate locations only when there is no constraint of movement of the movable body between the one or more candidate locations and the corresponding segment.

14. A mobile device comprising:
    a sensor to sense an environment variable;
    a storage configured to store information about a path network representing pathways accessible by a movable body carrying the mobile device, the path network including segments connected by junctions; and
    a processor configured to
    determine a first estimated location of the mobile device;
    when the first estimated location is not on the path network, identify a first segment in the path network, and when a distance between the first estimated location and the first segment is greater than a threshold, shift the first estimated location to a second estimated location that is closer to, but not on, the first segment; and
    determine a current location of the mobile device based on the second estimated location and a sensor reading from the sensor.

15. The mobile device of claim 14, wherein when the distance between the first estimated location and the first segment is less than a threshold, shift the first estimated location to a second estimated location that is on the first segment.

16. A mobile device comprising:
    a sensor to sense an environment variable;
    a storage configured to store information about a path network representing pathways accessible by a movable body carrying the mobile device, the path network including segments connected by junctions; and a processor configured to determine a first estimated location of the mobile device;

when the first estimated location is not on the path network,
  identify a first segment in the path network,
  shift the first estimated location to a second estimated location that is on or closer to the first segment based on a distance between the first estimated location and the first segment,
  determine a weight value based on a probability distribution function and the distance between the first estimated location and the corresponding segment, and
  determine a position of the second estimated location based on the weight value; and determine a current location of the mobile device based on the second estimated location and a sensor reading from the sensor.

17. The mobile device of claim 16, wherein the processor is configured to determine whether there is any constraint of movement of the movable body between the first estimated location and the first segment, and shift the first estimated location to the second estimated location only when there is no constraint of movement of the movable body between the first estimated location and the first segment.

* * * * *